(12) United States Patent
Kawamoto et al.

(10) Patent No.: US 9,092,894 B2
(45) Date of Patent: Jul. 28, 2015

(54) DISPLAY CONTROL DEVICE AND DISPLAY CONTROL PROGRAM FOR GROUPING RELATED ITEMS BASED UPON LOCATION

(75) Inventors: Kouichi Kawamoto, Kyoto (JP); Satoru Takahata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1218 days.

(21) Appl. No.: 11/723,971

(22) Filed: Mar. 22, 2007

(65) Prior Publication Data

US 2008/0188301 A1 Aug. 7, 2008

(30) Foreign Application Priority Data

Jan. 22, 2007 (JP) ................................. 2007-011782

(51) Int. Cl.
 *G06T 19/00* (2011.01)
 *G06F 17/30* (2006.01)
(52) U.S. Cl.
 CPC ........ *G06T 19/003* (2013.01); *G06F 17/30241* (2013.01); *G06T 2210/36* (2013.01)
(58) Field of Classification Search
 None
 See application file for complete search history.

(56) References Cited

U.S. PATENT DOCUMENTS

| | | | | |
|---|---|---|---|---|
| 5,032,989 A * | 7/1991 | Tornetta | ........................ | 705/1.1 |
| 5,671,342 A | 9/1997 | Millier et al. | | |
| 6,025,843 A * | 2/2000 | Sklar | ............................. | 715/841 |
| 6,075,536 A * | 6/2000 | Kunieda et al. | ............... | 715/848 |
| 6,414,691 B1 * | 7/2002 | Nakagawa et al. | ........... | 345/619 |
| 6,460,036 B1 * | 10/2002 | Herz | ..................................... | 1/1 |
| 7,023,446 B1 * | 4/2006 | Iwasaki | ......................... | 345/581 |
| 7,447,999 B1 * | 11/2008 | Robertson et al. | ............. | 715/835 |
| 7,587,681 B2 * | 9/2009 | Kake et al. | ..................... | 715/805 |
| 7,680,858 B2 * | 3/2010 | Poola et al. | ................... | 707/736 |
| 2003/0179231 A1 | 9/2003 | Kamiwada et al. | | |
| 2005/0010599 A1 * | 1/2005 | Kake et al. | ................. | 707/104.1 |
| 2008/0010291 A1 * | 1/2008 | Poola et al. | ..................... | 707/10 |

FOREIGN PATENT DOCUMENTS

| | | |
|---|---|---|
| GB | 2 366 978 | 3/2002 |
| JP | 2002-117034 | 4/2002 |
| JP | 2003-79942 | 3/2003 |
| JP | 2003-337041 | 11/2003 |
| JP | 2006-208756 | 8/2006 |
| WO | WO 01/63479 | 8/2001 |

OTHER PUBLICATIONS

Rayson, James K. "Aggregate towers: Scale sensitive visualization and decluttering of geospatial data." Information Visualization, 1999. (Info Vis' 99) Proceedings. 1999 IEEE Symposium on. IEEE, 1999.*
Notice of Reasons for Rejection (2 pages) issued in JP Appln No. 2007-011782 on Jun. 22, 2012.

* cited by examiner

*Primary Examiner* — Daniel Hajnik
(74) *Attorney, Agent, or Firm* — Nixon & Vanderhye P.C.

(57) ABSTRACT

A game device stores data of news information related to a plurality of news locations on a map. The game device divides the news locations into groups, and sets a determination region for each group. Further, the game device receives an input of designating a position in a display region from the user. When the designated position is within a determination region, news information related to one or more news locations included in a group corresponding to the determination region is displayed on a display device.

15 Claims, 22 Drawing Sheets

ID

DISPLAY CONTROL DEVICE AND DISPLAY CONTROL PROGRAM FOR GROUPING RELATED ITEMS BASED UPON LOCATION

CROSS REFERENCE TO RELATED APPLICATION

The disclosure of Japanese Patent Application No. 2007-011782, filed Jan. 22, 2007, is incorporated herein by reference.

TECHNICAL FIELD

Certain exemplary embodiments relate to a display control program and a display control device. More particularly, certain exemplary embodiments relate to a display control program and a display control device for displaying, on a display device, a virtual space, such as a map or the like, and information (e.g., news, etc.) related to a predetermined location in the virtual space.

BACKGROUND AND SUMMARY

Japanese Laid-Open Patent Publication No. 2002-117034 (Patent Document 1) describes a system for providing video/character news to the user. A news database server in this system is provided with a database storage section which comprises a video database section, a news database section, and a map database section. The map database section stores map image data, map coordinate data, and specific location symbols in relation to each other. The video database section stores video information in relation to location symbols corresponding to the coordinates of news locations. The news database section stores information in text which is prepared for news information or advertisement in relation to location symbols.

The user clicks a desired location in a map image displayed on a terminal to input a specific location symbol corresponding to the location, thereby accessing a database server. In response to the access, a search screen and map image information are transmitted from the server to the terminal, on which they are displayed. The database server searches the video database section and the news database section based on the location symbol to retrieve video information and character information, which are allowed to be displayed on the terminal. Thus, in the system, by selecting a location from the map image, video/character news at the location can be accessed.

In the system of Patent Document 1, when the user acquires information (video information and character information), the user needs to select (click) a location in a map image which is related to the information. With such a selection method, it is difficult to address a change in scale of map display. Specifically, for example, when a map with a small scale is displayed, a distance between each displayed location is short, so that a plurality of locations are displayed close together, and as a result, it is difficult to select a desired location. Thus, with the location selecting method described in Patent Document 1, it is difficult for the user to select a location when the scale of a displayed map is changed.

Therefore, a feature of certain exemplary embodiments is to provide a display control program and a display control device which achieve interface capable of facilitating selection of information related to a location when the user selects a location in a virtual space, such as a map or the like.

Certain exemplary embodiments have the following aspects to attain the feature mentioned above. Note that reference numerals, additional descriptions and the like inside parentheses in this section indicate correspondence to exemplary embodiments described below for the sake of easy understanding, and do not limit the certain exemplary embodiments described herein.

A first aspect is directed to a computer readable storage medium storing a display control program which is executed by a computer (CPU 10, etc.) of a display control device (game apparatus 3) for displaying a virtual space (map 51) and display information (news information) on a display device (television 2). The display control device comprises a storage means (main memory 13) for storing a plurality of pieces of the display information in relation to locations (news locations) in the virtual space. The program causes the computer to execute a display position comparing step (S37), a group setting step (S35, S39), a region setting step (S24), a first display control step (S59, S13), a first input receiving step (S3, S4), and a second display control step (S67, S13; S10, S13). In the display position comparing step, the computer compares positions in a display region of the display device of the locations to which the plurality of pieces of display information are related. In the group setting step, the computer sets a group of pieces of display information for which a distance between the locations is smaller than a predetermined first reference, based on a result of the comparison in the display position comparing step, thereby dividing the plurality of pieces of display information into a plurality of groups. In the region setting step, the computer sets a determination region corresponding to each of the groups in the display region. In the first display control step, the computer displays an image of the virtual space on the display device. In the first input receiving step, the computer receives an input designating a position in the display region from a user. In the second display control step, the computer, when the designated position is present within the determination region, displays the display information included in a group corresponding to the determination region on the display device using data stored in the storage means.

In a second aspect, in the group setting step, the computer may repeatedly execute a process of newly setting one group for predetermined display information for which a group has not been set, and putting, into the group, display information related to a location having a smaller distance from a location related to the display information in the display region than a predetermined distance (r2), until no display information for which a group has not been set remains.

In a third aspect, the storage means may further store a predetermined second reference for setting a determination region with respect to a position in the display region of each location. In this case, in the group setting step, the computer sets the predetermined distance based on the second reference. In the region setting step, the computer sets a determination region for a location to which a predetermined piece of display information included in a group is related, based on the second reference, as a determination region corresponding to the group.

In a fourth aspect, the determination region may be a circular region having a radius of a first length (r1), and the storage means stores the first length as the second reference. In the group setting step, the computer sets the predetermined distance to be a length two times larger than the first length.

In a fifth aspect, the determination region may be a circular region having a position in the display region of the location as a center thereof.

In a sixth aspect, in the region setting step, the computer may set a region including all locations to which display information included in a group is related, as a determination region for the group.

In a seventh aspect, the storage means further stores a predetermined second reference for setting a region for a position in the display region of each location. In this case, in the region setting step, the computer sets a region for each location to which display information included in a group is related, based on the second reference, and sets each set region as a determination region corresponding to the group.

In an eighth aspect, in the region setting step, the computer may calculate a position in the display region based on a display position of each location to which display information included in a group is related, and may set a region including the calculated position as a determination region corresponding to the group.

In a ninth aspect, in the first display control step, the computer may display an image of the virtual space and an image representing a group in relation to a position of the determination region corresponding to the group.

In a tenth aspect, in the second display control step, the computer may display a list of display information included in a group corresponding to the determination region when the designated position is present within the determination region.

In an eleventh aspect, the display control program causes the computer to further execute a second input receiving step (S3, S4) and a third display control step (S10, S13). In the second input receiving step, the computer receives an input of selecting display information from the list (71) of display information displayed in the second display control step. In the third display control step, the computer, when display information is selected in the second input receiving step, displays the selected display information on the display device.

In a twelfth aspect, the virtual space may be a three-dimensional space. In this case, the display control program causes the computer to further execute a camera setting step (S21), and a display position calculating step (S36). In the camera setting step, the computer changeably sets at least one of a position, an attitude, and a visual field angle of a virtual camera provided in the three-dimensional space. In the display position calculating step, the computer calculates a display position of the location based on the setting of the virtual camera. In this case, in the group setting step, the computer sets a group based on the display position calculated in the display position calculating step. In the first display control step, the computer generates an image of the three-dimensional space based on the setting of the virtual camera and displays the image on the display device.

In a thirteenth aspect, the virtual space may be a two-dimensional space. In this case, the display control program causes the computer to further execute a display setting step of changeably setting a size of a region to be displayed in the two-dimensional space. In the first display control step, the computer displays an image in the region set in the display setting step on the display device.

Note that certain exemplary embodiments may be provided in the form of a display control device having functions equivalent to the steps described above. Further, certain exemplary embodiments may be provided in the form of a data distributing system including a display control device (game device 3) and a server which can communicate with the display control device. In this case, the server transmits distribution data in which a plurality of pieces of display information are related to locations in a virtual space to the display control device. Also, the display control device has a storage means for storing distribution data transmitted from the server.

According to the first aspect, pieces of display information related to a plurality of locations displayed close together are put into one group, and a determination region is set for each group. Further, when the user designates a position in a determination region, display information included in a group corresponding to the determination region is displayed. Thereby, when the user selects a group by designating a position, all of a plurality of locations displayed close to that group are designated. As a result, all pieces of display information related to the plurality of locations are displayed. Therefore, according to the first aspect, it is possible to avoid the situation that an unintended location is designated, so that only display information which is not desired is displayed. Thereby, it is possible to facilitate selection of display information related to a location.

According to the second aspect, a group is set for predetermined display information, and display information related to a location close to the predetermined display information is put into the same group. Thereby, pieces of display information related to locations within a predetermined distance from the location to which the predetermined display information is related are put into one group. Therefore, a range of locations to which pieces of display information included in a group are related is not larger than necessary, i.e., a group can be appropriately set.

According to the third aspect, a determination region is set based on the same second reference for each group, so that each determination region has the same shape and size. Thereby, it is easy for the user to designate a determination region, so that an input operation having satisfactory operability can be provided.

According to the fourth aspect, the determination regions set for separate groups do not overlap each other, so that the determination region can be appropriately set.

According to the fifth aspect, the determination region is in the shape of a circle, so that it is easy to determine whether or not a position is present within a region.

According to the sixth aspect, a predetermined location related to each piece of display information included in a group is included in a determination region, so that if each location is designated, a determination region corresponding to the location can be reliably designated. Therefore, it is easy for the user to designate a determination region, so that an input operation having satisfactory operability can be provided.

According to the seventh aspect, a region is set for each piece of display information, and a determination region is set to include all regions set for all pieces of display information included in a group. Therefore, if the user designates a region set for display information included in a group, a determination region can be reliably designated. Therefore, a determination region can be easily and reliably designated, an input operation having operability satisfactory for the user can be provided.

According to the eighth aspect, a determination region is determined, taking into consideration positions of all locations corresponding to all pieces of display information included in a group, thereby making it possible to set the determination region at an appropriate position.

According to the ninth aspect, an image representing a group is displayed in relation to a position of a determination region corresponding to the group, so that the user can easily recognize the set group.

According to the tenth aspect, when the user selects a group, a list of display information included in the group is displayed. Therefore, the user can recognize pieces of display information in the selected group at a glance.

According to the eleventh aspect, the user can select display information when a list of display information is displayed, and see further information (e.g., more detailed information) by selecting display information. Thus, by presenting display information in a stepwise manner, the user can more easily search for desired display information.

According to the twelfth aspect, even when a distance between predetermined locations on a map is changed by enlarging or reducing a three-dimensional map image or changing an angle of depression, an appropriate group can be set in real time.

According to the thirteenth aspect, even when a distance between predetermined locations on a map is changed by enlarging or reducing a two-dimensional map image, an appropriate group can be set in real time.

These and other features, aspects and advantages of the certain exemplary embodiments described herein will become more apparent from the following detailed description when taken in conjunction with the accompanying drawings.

DETAILED DESCRIPTION

Figure 1:
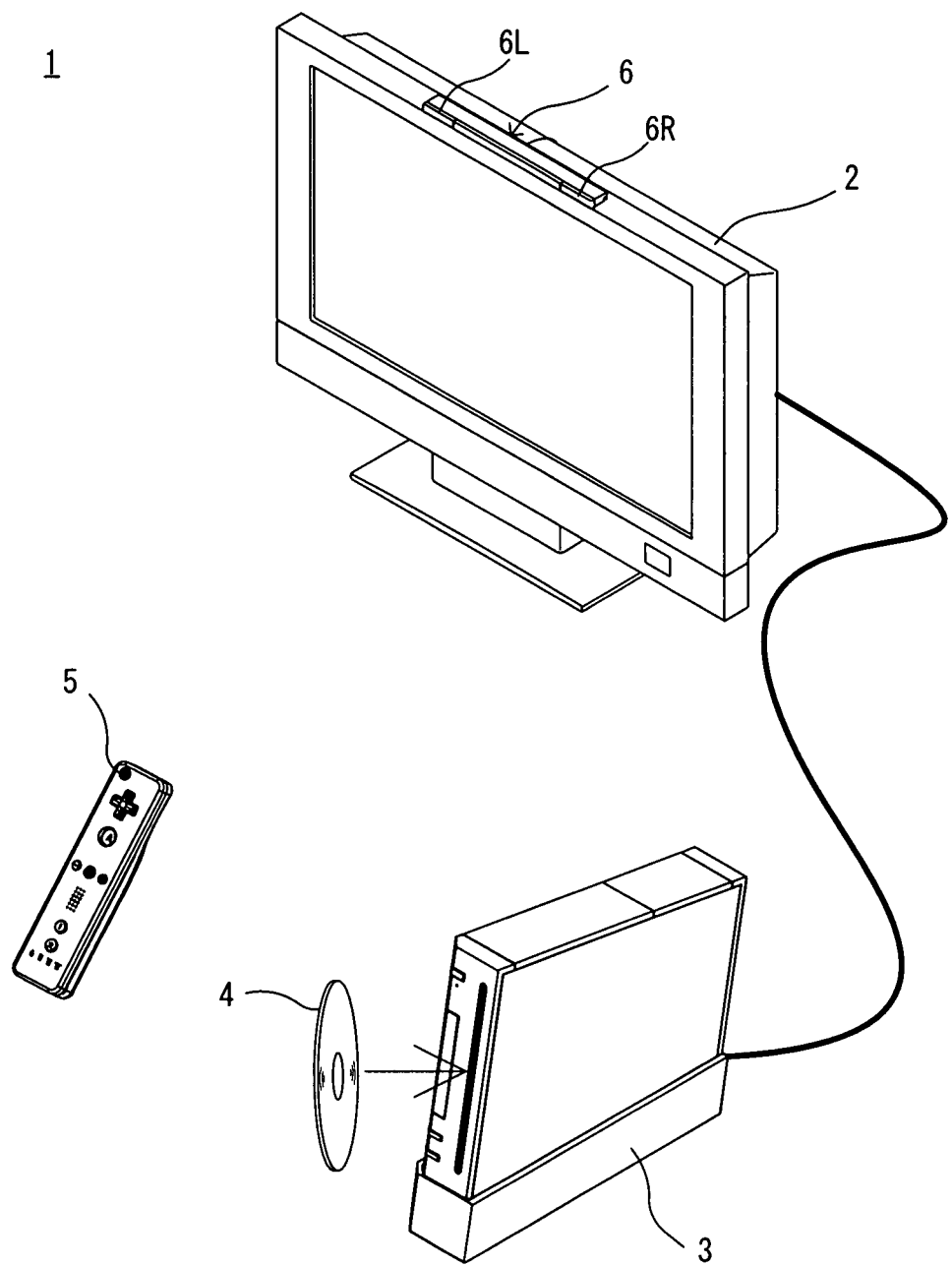
FIG. 1 is an external view of a game system 1.

A game system 1 including a game apparatus according to an exemplary embodiment will be described with reference to FIG. 1. FIG. 1 is an external view of the game system 1. Hereinafter, the game apparatus and a game program of the exemplary embodiment will be described, where the game apparatus is a stationary game apparatus as an example. In FIG. 1, the game system 1 includes a television set (hereinafter simply referred to as a "television") 2, a game apparatus 3, an optical disc 4, a controller 5, and a sensor bar 6. In the game system 1, the game apparatus 3 executes a game process based on a game operation using the controller 5.

The optical disc 4 which is an exemplary information storing medium changeable with respect to the game apparatus 3 is detachably loaded into the game apparatus 3. On a front surface of the game apparatus 3, a slot through which the optical disc 4 is loaded or unloaded is provided. The game apparatus 3 executes a game process by reading and executing a game program stored on the optical disc 4 which has been loaded through the slot.

The television 2 is connected via a connection cord to the game apparatus 3. The television 2 is a display device, such as a television set for home use or the like. The television 2 displays a game image which is obtained as a result of the game process executed in the game apparatus 3. The sensor bar 6 is provided in the vicinity of the screen of the television 2 (on an upper side of the screen in FIG. 1). The sensor bar 6 comprises two markers 6R and 6L at both ends thereof. Specifically, the markers 6R and 6L are one or more infrared LEDs which output infrared light toward the front of the television 2. The sensor bar 6 is connected to the game apparatus 3, so that the game apparatus 3 can control ON/OFF of each infrared LED included in the sensor bar 6.

The controller 5 is an input device which inputs operation data indicating an operation performed with respect to the controller 5, to the game apparatus 3. The controller 5 and the game apparatus 3 are connected via wireless communication. In this exemplary embodiment, for example, the Bluetooth® technology is used for wireless communication between the controller 5 and the game apparatus 3. Note that, in another exemplary embodiment, the controller 5 and the game apparatus 3 may be connected via wired communication.

(Internal Configuration of Game Apparatus 3)

Next, a configuration of the game apparatus 3 will be described with reference to FIG. 2. Note that FIG. 2 is a functional block diagram of the game apparatus 3.

Figure 2:
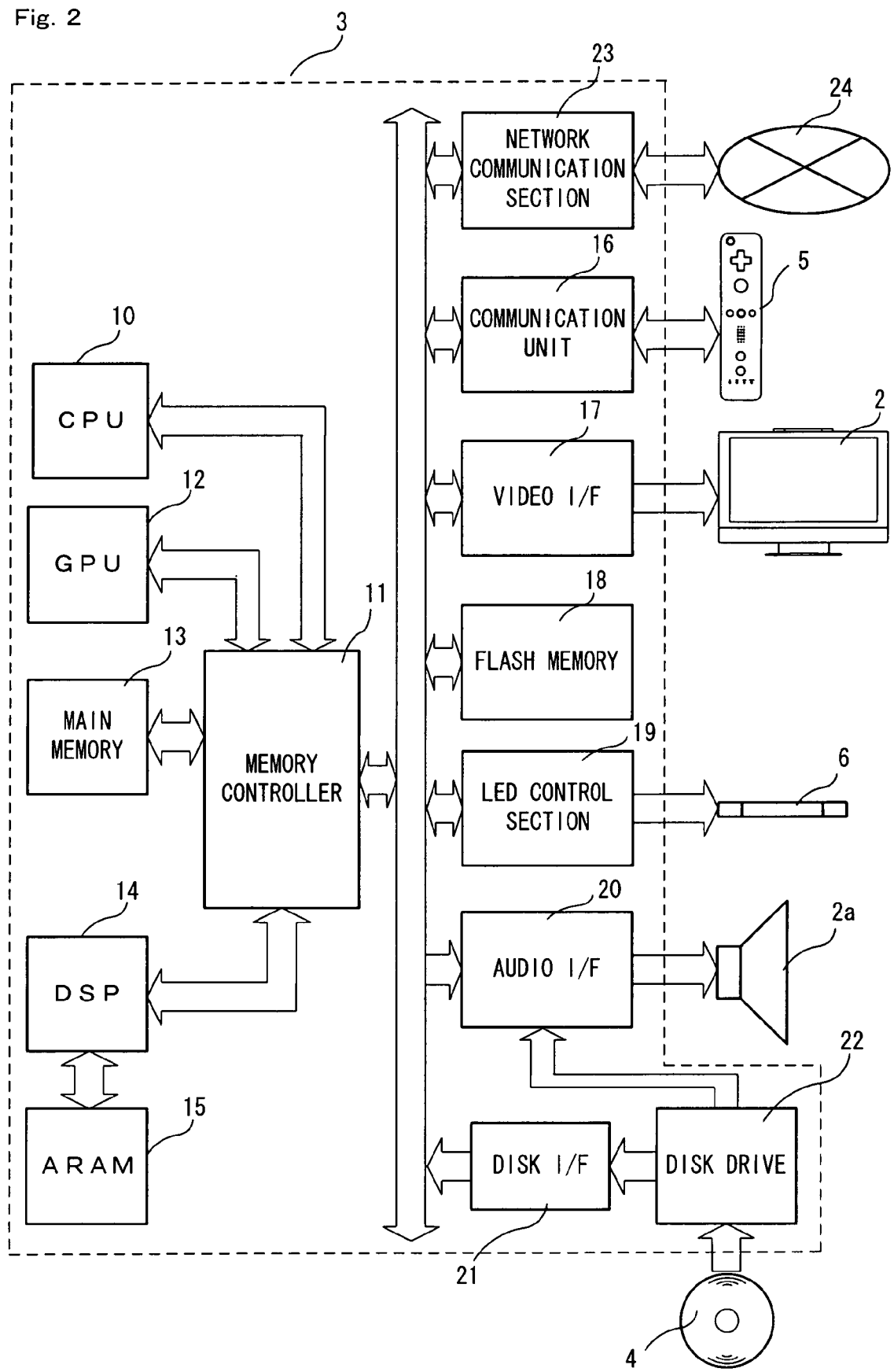
FIG. 2 is a functional block diagram of a game apparatus 3.

In FIG. 2, the game apparatus 3 comprises a CPU (Central Processing Unit) 10, which executes various programs. The CPU 10 executes a boot program stored in a boot ROM (not shown), executes, for example, initialization of memories, such as a main memory 13 and the like, before executing a game program stored on the optical disc 4, and executes a game process or the like corresponding to the game program. A GPU (Graphics Processing Unit) 12, the main memory 13, a DSP (Digital Signal Processor) 14, an ARAM (Audio RAM) 15, and the like are connected via a memory controller 11 to the CPU 10. A communication unit 16, a video I/F (interface) 17, a flash memory 18, an LED control section 19, an audio I/F 20, and a disk I/F 21 are connected via a predetermined bus to the memory controller 11. The video I/F 17 is connected to the television 2. The LED control section 19 is connected to the sensor bar 6. The audio I/F 20 is connected to a loudspeaker 2a and a disk drive 22 of the television 2. The disk I/F 21 is connected to the disk drive 22.

The GPU 12, which executes image processing based on a command from the CPU 10, comprises a semiconductor chip which executes a calculation process required for 3D graphics display, for example. The GPU 12 executes image processing using a memory specialized for image processing (not shown) or a memory area which is a portion of the main memory 13. The GPU 12 generates game image data or movie video to be displayed on the television 2 by the image processing, and outputs the data via the memory controller 11 and the video I/F 17 to the television 2 as required.

The main memory 13 is a memory area which is used by the CPU 10, and stores a game program or the like required for a process by the CPU 10, as required. For example, the main memory 13 stores a game program, various data, or the like read from the optical disc 4 by the CPU 10. The game program stored in the main memory 13 is executed by the CPU 10.

The DSP 14 processes sound data or the like which is generated by the CPU 10 when a game program is executed. The ARAM 15 for storing the sound data or the like is connected to the DSP 14. The ARAM 15 is used when the DSP 14 executes a predetermined process (e.g., storage of a read-ahead game program or sound data). The DSP 14 reads sound data stored in the ARAM 15, and outputs the data via the memory controller 11 and the audio I/F 20 to the loudspeaker 2a.

The memory controller 11 executes a centralized control of data transfer. The communication unit 16, the flash memory 18, the LED control section 19, the various I/Fs 17, 20 and 21, and a network communication section 23 are connected to the memory controller 11.

The communication unit 16 transmits and receives data between the game apparatus 3 and the controller 5. The controller 5 transmits operation data indicating an operation performed with respect to the controller 5, to the game apparatus 3. The communication unit 16 receives operation data from the controller 5, and outputs the received operation data via the memory controller 11 to the CPU 10. The CPU 10 executes a game process in accordance with the operation data. Control data for controlling an operation of the controller 5 is transmitted to the controller 5 as follows: the control data is output to the communication unit 16, which in turn transmits the input control data to the controller 5.

The television 2 is connected to the video I/F 17. Image data generated by the GPU 12 is output via the video I/F 17 to the television 2. The flash memory 18 functions as a backup memory for fixedly storing data, such as saved data or the like. The game apparatus 3 can reproduce a game state which was executed in the past, using the saved data stored in the flash memory 18, and display a game image on the television 2. The infrared LED included in the sensor bar 6 is connected to the LED control section 19. To turn ON the infrared LED, the CPU 10 instructs the LED control section 19 to supply a voltage to the infrared LED. The LED control section 19 supplies a voltage to the infrared LED in accordance with the voltage supply instruction, so that the infrared LED is turned ON. In this exemplary embodiment, the infrared LED is ON during at least a period of time when a game program is being executed. The loudspeaker 2a of the television 2 is connected to the audio I/F 20. Data read from the ARAM 15 by the DSP 14 or sound data directly output from the disk drive 22 is output from the loudspeaker 2a. The disk drive 22 is connected to the disk I/F 21. The disk drive 22 reads data stored on the optical disc 4 disposed at a predetermined read position, and outputs the read data to the disk I/F 21 or the audio I/F 20.

The network communication section 23 has a function of connecting with a wireless LAN, and is connected to a network 24, such as the Internet or the like. The game device 3 can obtain news data, a game program, and various data described below from the outside via the network communication section 23, and transmit data to the outside.

(Configuration of Controller 5)

Figure 3:
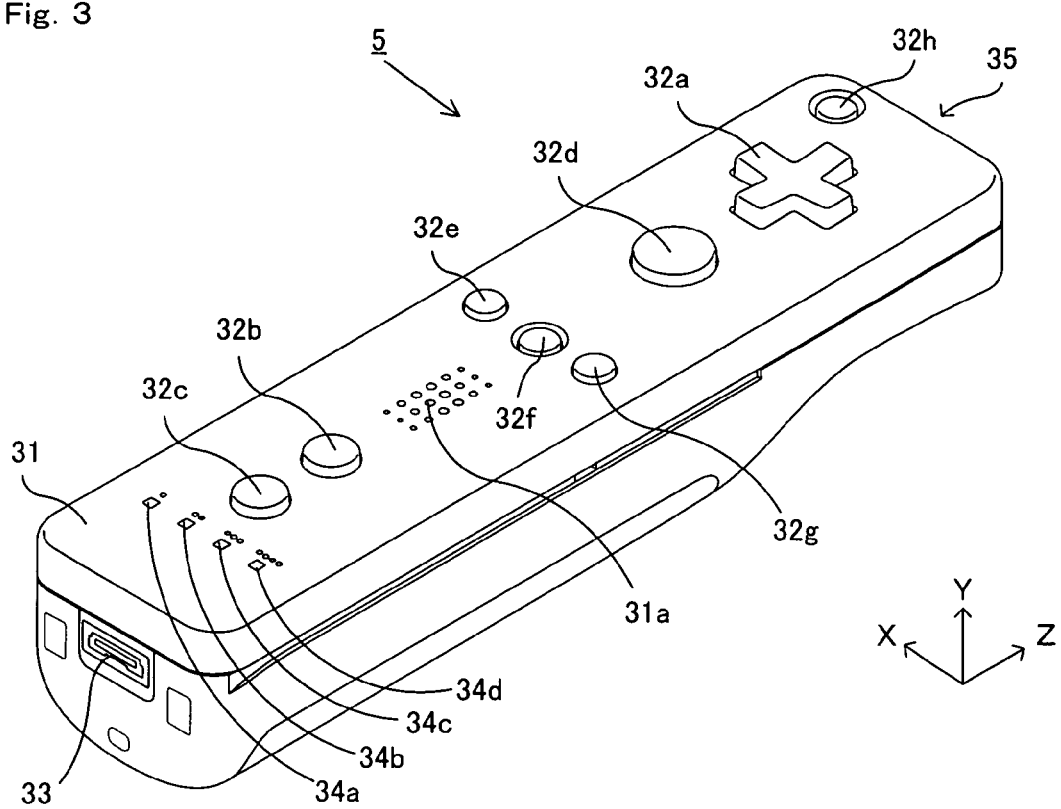
FIG. 3 is a perspective view of an external appearance of a structure of a controller 5.
Figure 4:
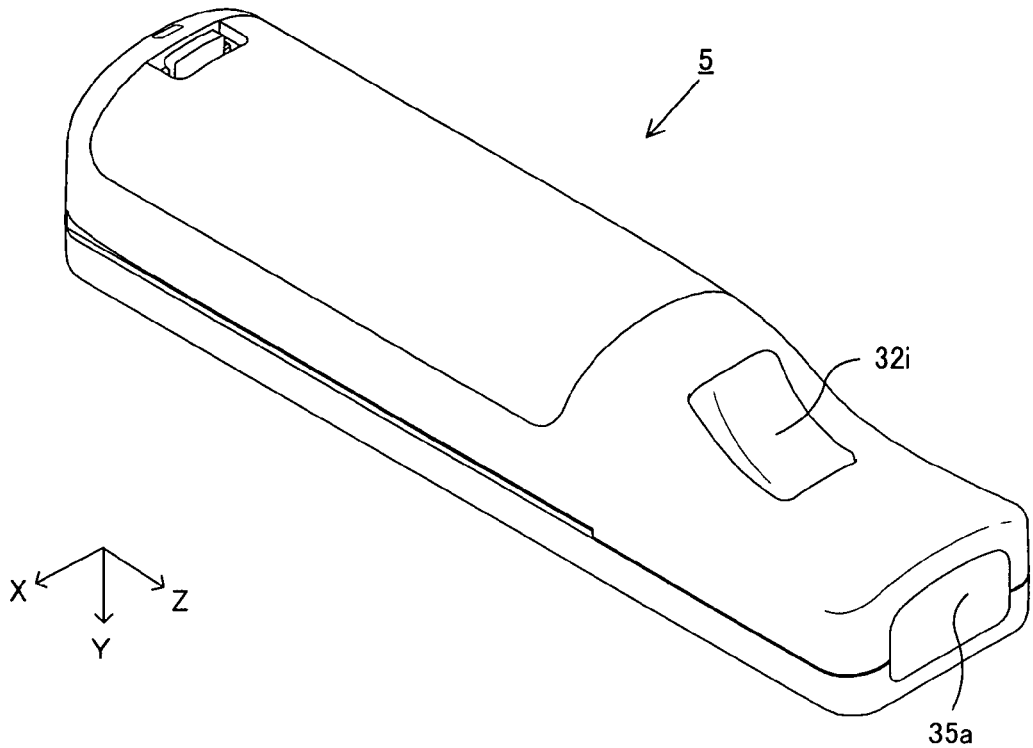
FIG. 4 is a perspective view of an external appearance of the structure of the controller 5.

Next, the controller 5 will be described with reference to FIGS. 3 to 6. FIGS. 3 and 4 are perspective views illustrating an external appearance of the controller 5. FIG. 3 is a perspective view of the controller 5 as viewed from the top and the rear. FIG. 4 is a perspective view of the controller 5 as viewed from the bottom and the front.

In FIGS. 3 and 4, the controller 5 has a housing 31 which is formed by, for example, plastic molding. The housing 31 is in the shape of substantially a rectangular parallelepiped where a front-to-rear direction (the Z-axis direction in FIG. 3) is a longitudinal direction. The whole housing 31 has a size which enables an adult and a child to hold the controller 5 with one hand. A user (player) performs a game operation by using the controller 5, i.e., specifically, pressing down a button provided on the controller 5, and moving the controller 5 itself to change a position or an attitude of the controller 5.

The housing 31 is provided with a plurality of operation buttons. As illustrated in FIG. 3, a cross key 32a, a first button 32b, a second button 32c, an A button 32d, a minus button 32e, a home button 32f, a plus button 32g, and a power button 32h are provided on an upper surface of the housing 31. On the other hand, as illustrated in FIG. 4, a hollow portion is formed on a lower surface of the housing 31. A B button 32i is provided on a rear slope surface of the hollow portion. These operation buttons 32a to 32i are assigned respective functions depending on a game program executed by the game apparatus 3 as required. The power button 32h is used to remotely power ON/OFF the main body of the game apparatus 3. Upper surfaces of the home button 32f and the power button 32h are buried below the upper surface of the housing 31. Thereby, the user is prevented from unintentionally and erroneously pressing down the home button 32f and the power button 32h.

A connector 33 is provided on a rear surface of the housing 31. The connector 33 is used to connect the controller 5 with other devices (e.g., another controller).

A plurality of LEDs 34a to 34d (four LEDs in FIG. 3) are provided at a rear portion of the upper surface of the housing 31. Here, the controller 5 is assigned controller identification (number) so as to distinguish it from other controllers. The LEDs 34a to 34d are used so as to notify the player of controller identification currently set for the controller 5, the state of charge of a battery in the controller 5, or the like. Specifically, when a game operation is performed using the controller 5, any one of the LEDs 34a to 34d is turned ON, depending on the controller identification.

Figure 5A:
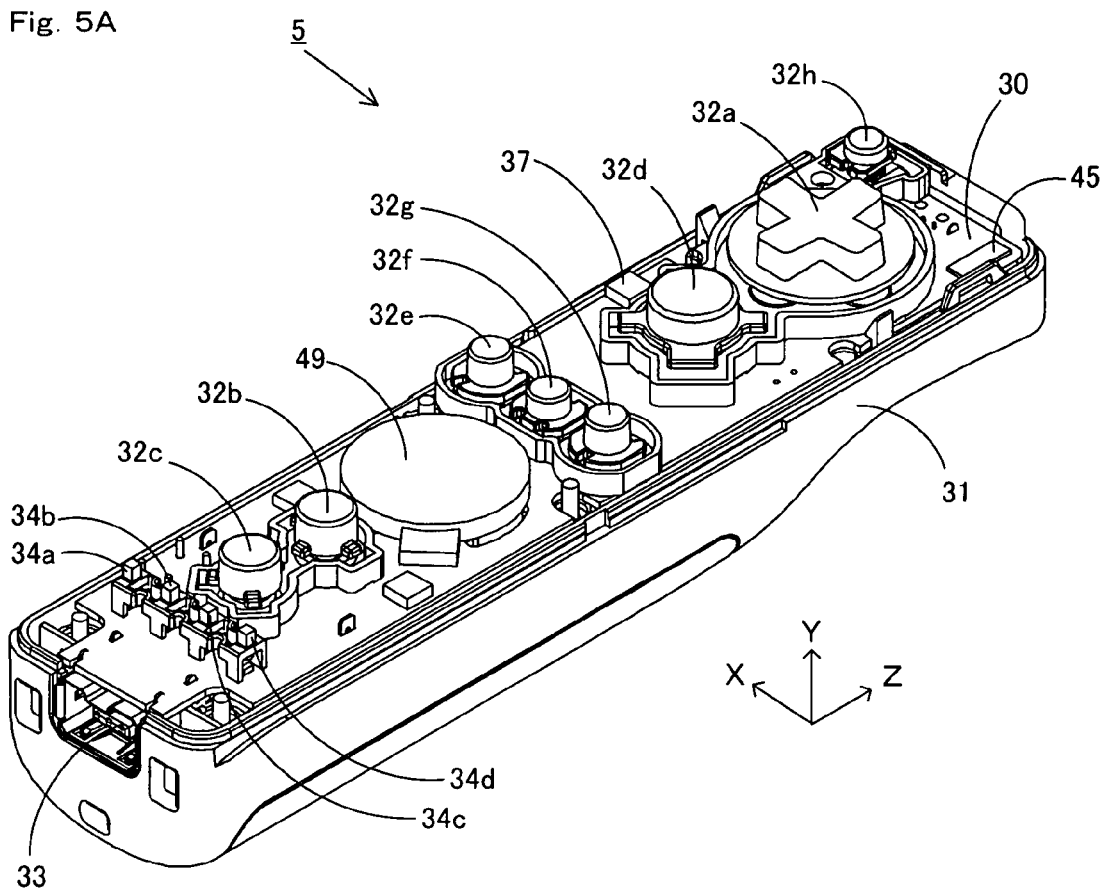
FIG. 5A is a diagram illustrating an internal structure of the controller 5.
Figure 5B:
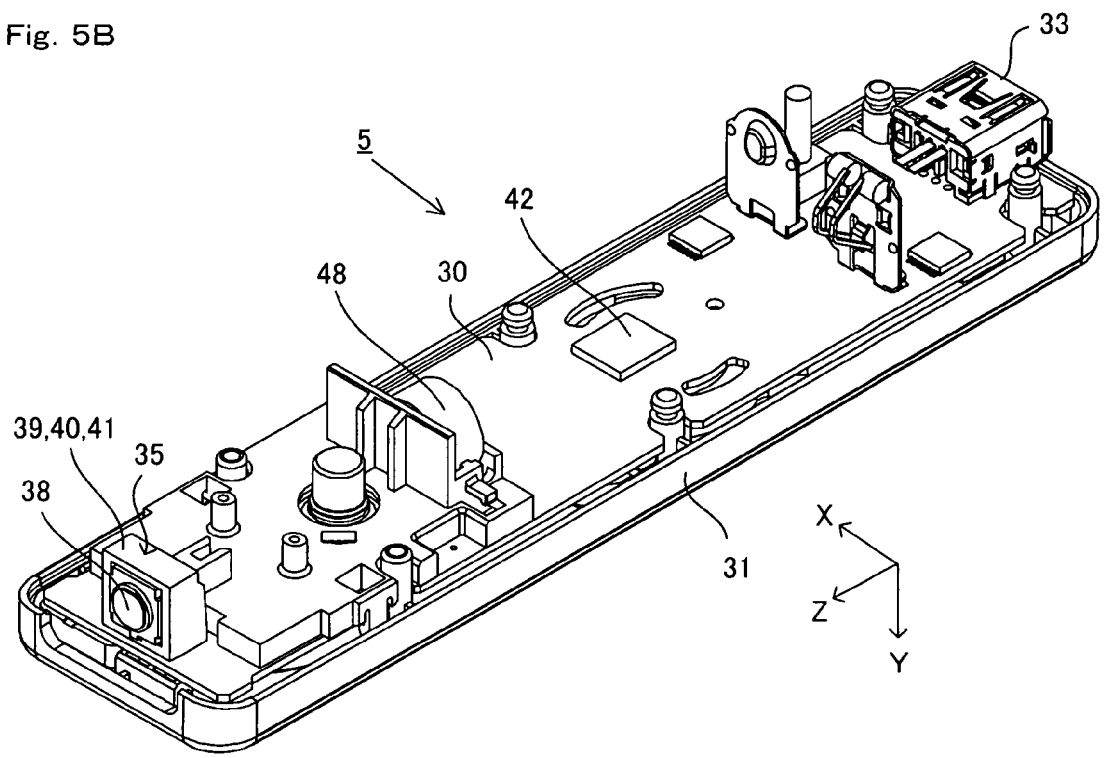
FIG. 5B is a diagram illustrating an internal structure of the controller 5.

The controller 5 has an image capture information computing section 35 (FIG. 5B). As illustrated in FIG. 4, a light incident surface 35a for the image capture information computing section 35 is provided on a front surface of the housing 31. The light incident surface 35a is made of a material which can transmit at least infrared light from the markers 6R and 6L.

Also, sound holes 31a through which sound is emitted from a loudspeaker 49 (FIG. 5A) included in the controller 5 to the outside, are formed between the first button 32b and the home button 32f on the upper surface of the housing 31.

Next, an internal structure of the controller 5 will be described with reference to FIGS. 5A and 5B. FIGS. 5A and 5B are diagrams illustrating the internal structure of the controller 5. Note that FIG. 5A is a perspective view of the controller 5 where an upper housing (a portion of the housing 31) is cut away. FIG. 5B is a perspective view of the controller 5 where a lower housing (a portion of the housing 31) is cut away. FIG. 5B illustrates a perspective view of a baseboard 30 of FIG. 5A as viewed from a bottom surface thereof.

In FIG. 5A, the base board 30 is fixed inside the housing 31. On an upper major surface of the baseboard 30, the operation buttons 32a to 32h, the LEDs 34a to 34d, an acceleration sensor 37, an antenna 45, the loudspeaker 49, and the like are provided. These are connected to a microcomputer 42 (see FIG. 5B) via conductors (not shown) formed on the base board 30 and the like. In this exemplary embodiment, the acceleration sensor 37 is positioned away from a center of the controller 5 in the X-axis direction, thereby facilitating calculation of a motion of the controller 5 when the controller 5 is rotated around the Z axis. A radio module 44 (FIG. 6) and the antenna 45 enable the controller 5 to function as a wireless controller.

On the other hand, in FIG. 5B, the image capture information computing section 35 is provided at a front edge on a lower major surface of the base board 30. The image capture information computing section 35 comprises an infrared filter 38, a lens 39, an image capturing device 40, and an image processing circuit 41, which are arranged in this order from the front of the controller 5. These members 38 to 41 are attached on the lower major surface of the base board 30.

The microcomputer 42 and a vibrator 48 are provided on the lower major surface of the base board 30. The vibrator 48 may be, for example, a vibration motor or a solenoid. The vibrator 48 is connected to the microcomputer 42 via a conductor formed on the baseboard 30 and the like. The activation of the vibrator 48, which is instructed by the microcomputer 42, generates vibration in the controller 5. Thereby, the vibration is transferred to a user's hand holding the controller 5, thereby making it possible to achieve a so-called vibration-feature supporting game. In this exemplary embodiment, the vibrator 48 is disposed somehow closer to the front of the housing 31, i.e., the vibrator 48 is placed closer to the end of the controller 5 than the center of the controller 5 is. Therefore, the vibration of the vibrator 48 significantly vibrates the whole controller 5. The connector 33 is attached to a rear edge on the major lower surface of the base board 30. Note that, in addition to the parts of FIGS. 5A and 5B, the controller 5 comprises a quartz oscillator for generating a basic clock for the microcomputer 42, an amplifier for outputting an audio signal to the loudspeaker 49, and the like.

Note that the shape of the controller 5, the shape of each operation button, the numbers and arrangements of acceleration sensors and vibrators, and the like of FIGS. 3 to 5A and 5B and the like are only for illustrative purposes. Certain exemplary embodiments can be implemented using other shapes, numbers and arrangements. The image capture information computing section 35 (the light incident surface 35a of the image capture information computing section 35) in the controller 5 may not be positioned on the front surface of the housing 31, and may be provided on other surfaces as long as it can capture light from the outside of the housing 31.

Figure 6:
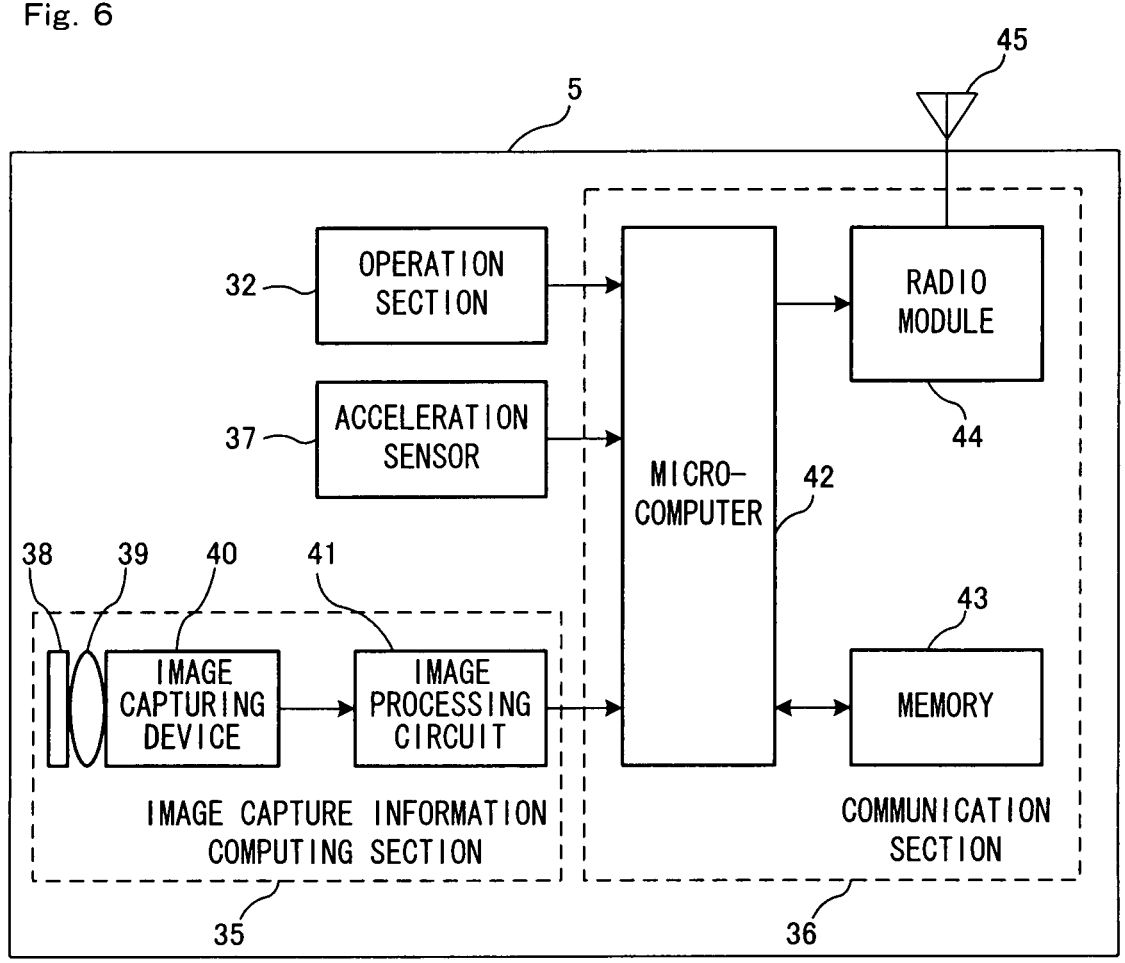
FIG. 6 is a block diagram illustrating a configuration of the controller 5.

FIG. 6 is a block diagram illustrating a configuration of the controller 5. The controller 5 comprises an operation section 32 (operation buttons 32a to 32i), the connector 33, the image capture information computing section 35, a communication section 36, and the acceleration sensor 37. The controller 5 transmits data depending on an attitude of the controller 5, as operation data, to the game apparatus 3.

The operation section 32 includes the operation buttons 32a to 32i, and outputs data indicating an input state of each of the operation buttons 32a to 32i (whether or not each of the operation buttons 32a to 32i has been pressed down) to the microcomputer 42 of the communication section 36.

The acceleration sensor 37 detects an acceleration (including a gravity acceleration) of the controller 5, i.e., detects a force (including gravity) applied to the controller 5. Of accelerations applied to a detection portion of the acceleration sensor 37, the acceleration sensor 37 detects a value of an acceleration (linear acceleration) in a linear direction along a sensing-axis direction. For example, in the case of a multi-axis acceleration sensor having two or more axes, an acceleration component along each axis is detected as an acceleration applied to the detection portion of the acceleration sensor. For example, a three- or two-axis acceleration sensor may be available from Analog Devices, Inc. or STMicroelectronics N.V.

In this exemplary embodiment, the acceleration sensor 37 detects a linear acceleration along each of three axes extending in a vertical direction (Y-axis direction in FIG. 3), a lateral direction (X-axis direction in FIG. 3), and a front-to-rear direction (Z-axis direction in FIG. 3), where the controller 5 is used as a reference. Since the acceleration sensor 37 detects an acceleration with respect to a linear direction along each axis, an output of the acceleration sensor 37 indicates a value of a linear acceleration along each axis. In other words, the detected acceleration is represented as a three-dimensional vector in an XYZ coordinate system provided where the controller 5 is a reference. A vector having acceleration values with respect to a plurality of axes which are detected by the acceleration sensor 37, is referred to as an acceleration vector.

Note that, in a process described below of this exemplary embodiment, data output from the acceleration sensor 37 is not used, and therefore, the controller 5 may not comprise the acceleration sensor 37.

The image capture information computing section 35 is a system for analyzing image data captured by an image capturing means to determine a region having a high luminance in the image data and detect a center-of-gravity position, a size or the like of the region. The image capture information computing section 35 has, for example, a maximum sampling cycle of about 200 frames/sec, and therefore, can track and analyze a relatively high-speed motion of the controller 5.

The image capture information computing section 35 includes the infrared filter 38, the lens 39, the image capturing device 40, and the image processing circuit 41. The infrared filter 38 passes only infrared light entering from the front of the controller 5. The lens 39 collects infrared light passing through the infrared filter 38 and causes the light to enter the image capturing device 40. The image capturing device 40 may be, for example, a solid-state image capturing device, such as a CMOS sensor or a CCD sensor, receives infrared light collected by the lens 39, and outputs an image signal. Here, the markers 6R and 6L of the sensor bar 6 provided in the vicinity of the display screen of the television 2 are each made of an infrared LED which outputs infrared light toward the front of the television 2. Therefore, by providing the infrared filter 38, the image capturing device 40 captures only infrared light passing through the infrared filter 38 to generate image data. Thereby, images of the markers 6R and 6L can be more correctly captured. Hereinafter, the image captured by the image capturing device 40 is referred to as a captured image. The image data generated by the image capturing device 40 is processed by the image processing circuit 41. Specifically, the image processing circuit 41 calculates a position of a target object (the markers 6R and 6L) in the captured image. The image processing circuit 42 outputs coordinates indicating the calculated position to the microcomputer 42 of the communication section 36. The coordinate data is transmitted as operation data by the microcomputer 42 to the game apparatus 3. Hereinafter, the coordinates are referred to as "marker coordinates". The marker coordinates vary, depending on an orientation (attitude) or a position of the controller 5 itself. Therefore, the game apparatus 3 can use the marker coordinates to calculate the orientation or position of the controller 5. Note that, in another exemplary embodiment, the controller 5 may transmit data required for calculation of the marker coordinates (e.g., data of a captured image) to the game apparatus 3, and based on the data, the game apparatus 3 may calculate the marker coordinates.

The communication section 36 includes the microcomputer 42, a memory 43, the radio module 44, and the antenna 45. The microcomputer 42 controls the radio module 44 which wirelessly transmits data obtained by the microcomputer 42 to the game apparatus 3, while using the memory 43 as a memory area during a process.

Data output from the operation section 32, the image capture information computing section 35, and the acceleration sensor 37 to the microcomputer 42 is temporarily stored in the memory 43. The data is transmitted as the operation data to the game apparatus 3. Specifically, when the timing of transmission to the reception unit 16 arrives, the microcomputer 42 outputs the operation data stored in the memory 43 to the radio module 44. The radio module 44 uses, for example, the Bluetooth® technique to modulate carrier waves having a predetermined frequency with the operation data, and emits a resultant weak radio wave signal from the antenna 45. In other words, the operation data is modulated by the radio module 44 into the weak radio wave signal, which is in turn transmitted from the controller 5. The weak radio wave signal is received by the reception unit 16 of the game apparatus 3. By demodulation or decoding of the received weak radio wave signal, the game apparatus 3 can obtain the operation data. The CPU 10 of the game apparatus 3 performs a game process based on the obtained operation data and a game program. Note that wireless transmission from the communication section 36 to the reception unit 16 is sequentially executed in predetermined cycles. Since a game process is generally executed in units of 1/60 sec (one frame time), transmission is preferably performed in cycles which are shorter than 1/60 sec. For example, the communication section 36 of the controller 5 outputs the operation data to the communication unit 16 of the game apparatus 3 at a rate of one per 1/200 sec.

The player can perform an operation of pointing any position on the screen using the controller 5 in addition to a conventional general game operation of pressing down each operation button.

Figure 7:
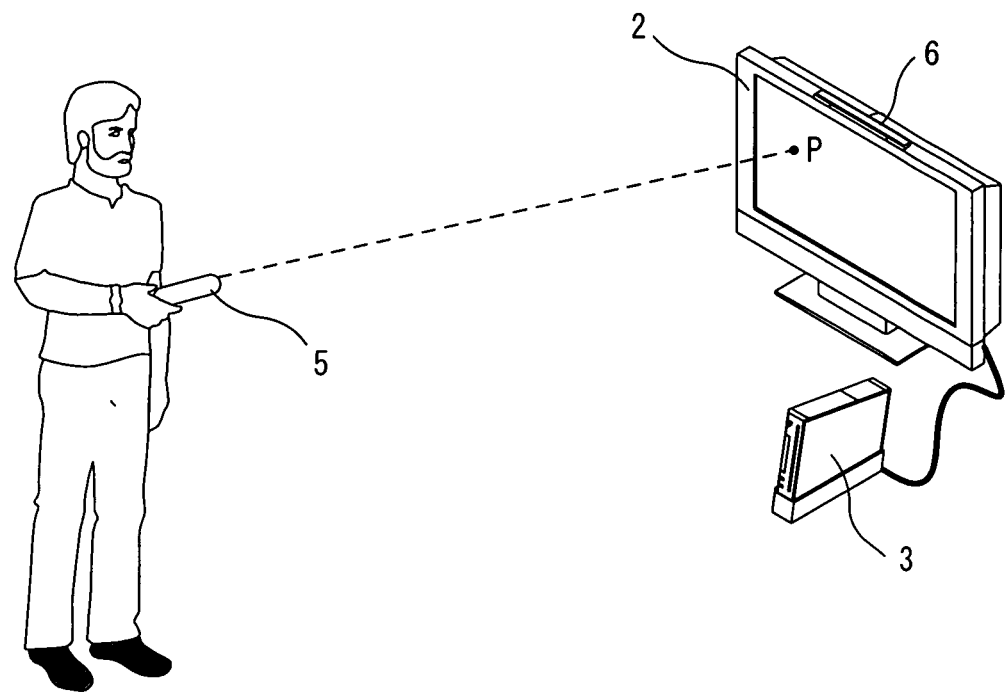
FIG. 7 is a diagram illustrating a situation where the controller 5 is used to perform a game operation.

An exemplary game operation will be described with reference to FIG. 7. FIG. 7 is a diagram illustrating a situation where the user uses the controller 5 to perform a game operation. In this exemplary embodiment, as illustrated in FIG. 7, the user performs a game operation of pointing at a position P on the screen of the television 2 using the controller 5. Here, the position P is a position on the screen which is pointed by the controller 5, and is ideally a position which is an intersection of a straight line extended in the longitudinal direction from the front end portion of the controller 5 and the screen of the television 2. Note that the position P does not need to be exactly such an ideal position, and a position in the vicinity of such an ideal position may be calculated by the game apparatus 3. Hereinafter, a position on the screen pointed by the controller 5 is referred to as a "pointing position". The user performs a game operation by moving the pointing position on the screen.

Although the game device 3 employs a cursor displayed at a pointing position pointed by the controller 5 so as to provide a command to designate a position on the screen in this exemplary embodiment, the designation of a position on the screen may be achieved in any manner in other exemplary embodiments. In the game device 3, for example, an input device, such as a button, a mouse, a stick or the like, may be used to receive a command input which designates a position on the screen.

(Outline of Process in Game Device 3)

Hereinafter, an outline of a process executed in the game device 3 according to this exemplary embodiment will be described. In this exemplary embodiment, the game device 3 acquires news of places in the world via a network from an external server, and presents the acquired news to the user. The game device 3 stores data of a map, and data of the news information acquired from the server, which is related to locations on the map. The game device 3 uses these data to display the map, and causes the user to perform an operation of selecting a location on the map, so that news information related to the location is presented to the user. Hereinafter, of the locations on the map, a location related to news information is referred to as a "news location".

In this exemplary embodiment, the process of presenting news information to the user roughly has the following three modes: a map display mode, a list display mode, and a text display mode. The map display mode is a mode in which a map, and an icon representing news information related to each news location on the map, are displayed, and the user is allowed to select a group of news information. The list display mode is a mode in which a list of news information included in a group selected by the user in the map display mode is displayed, and the user is allowed to select a piece of news information from the list. The text display mode is a mode in which news is presented to the user by displaying the contents (a text, an image or the like of the news) of news information selected by the user in the list display mode. Hereinafter, an outline of the process of this exemplary embodiment in each mode will be described with reference to FIGS. 8 to 15.

Firstly, an outline of a process in the map display mode will be described. In the map display mode, the game device 3 generates an image of a map to be displayed. In this exemplary embodiment, the map to be displayed is a globe (world map), and is constructed in the shape of a sphere in a three-dimensional virtual space (see FIG. 9). A virtual camera for generating an image to be displayed on the screen of the television 2 is set in the virtual space. The game device 3 generates an image of the map as viewed from the virtual camera, and displays the generated image on the television 2. Also, in this exemplary embodiment, an operation of enlarging or reducing the map (i.e., the scale of the map is changed) by moving the virtual camera or an object and an operation of changing an angle of depression of the virtual camera can be performed.

Figure 8:
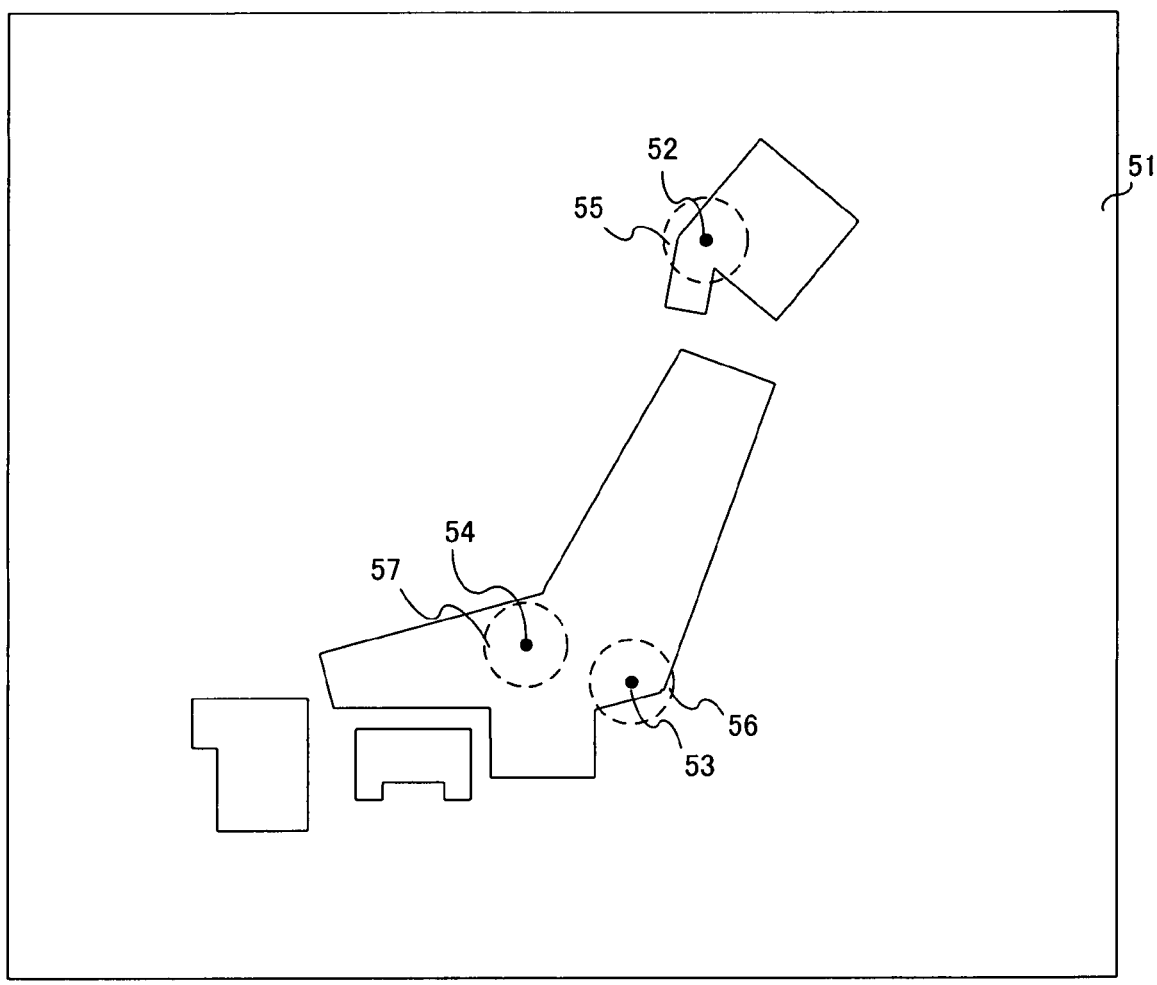
FIG. 8 is a diagram illustrating an image of a map 51 which is generated with a certain scale.
Figure 9:
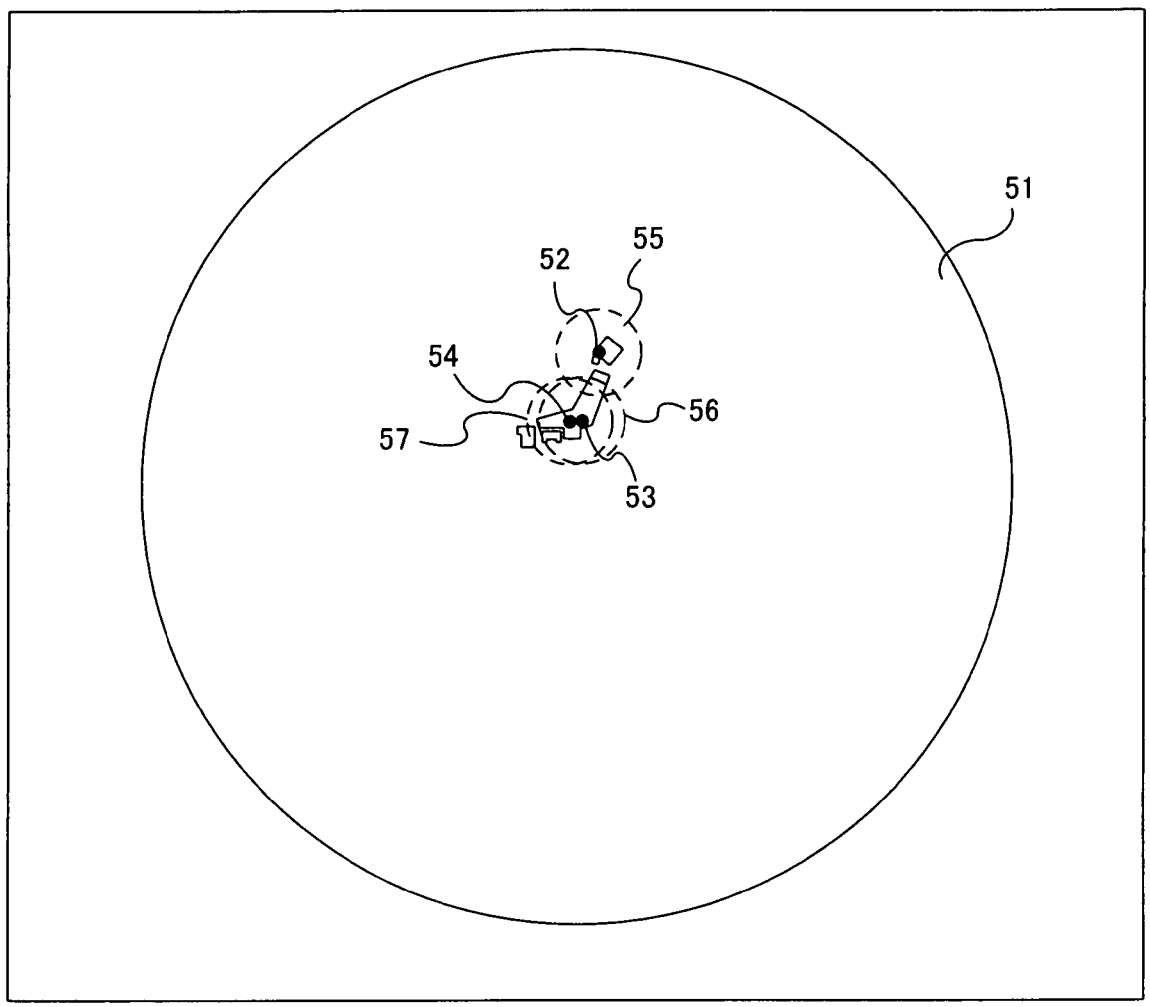
FIG. 9 is a diagram illustrating an image of the map 51 the scale of which is changed from the image of FIG. 8.
Figure 10:
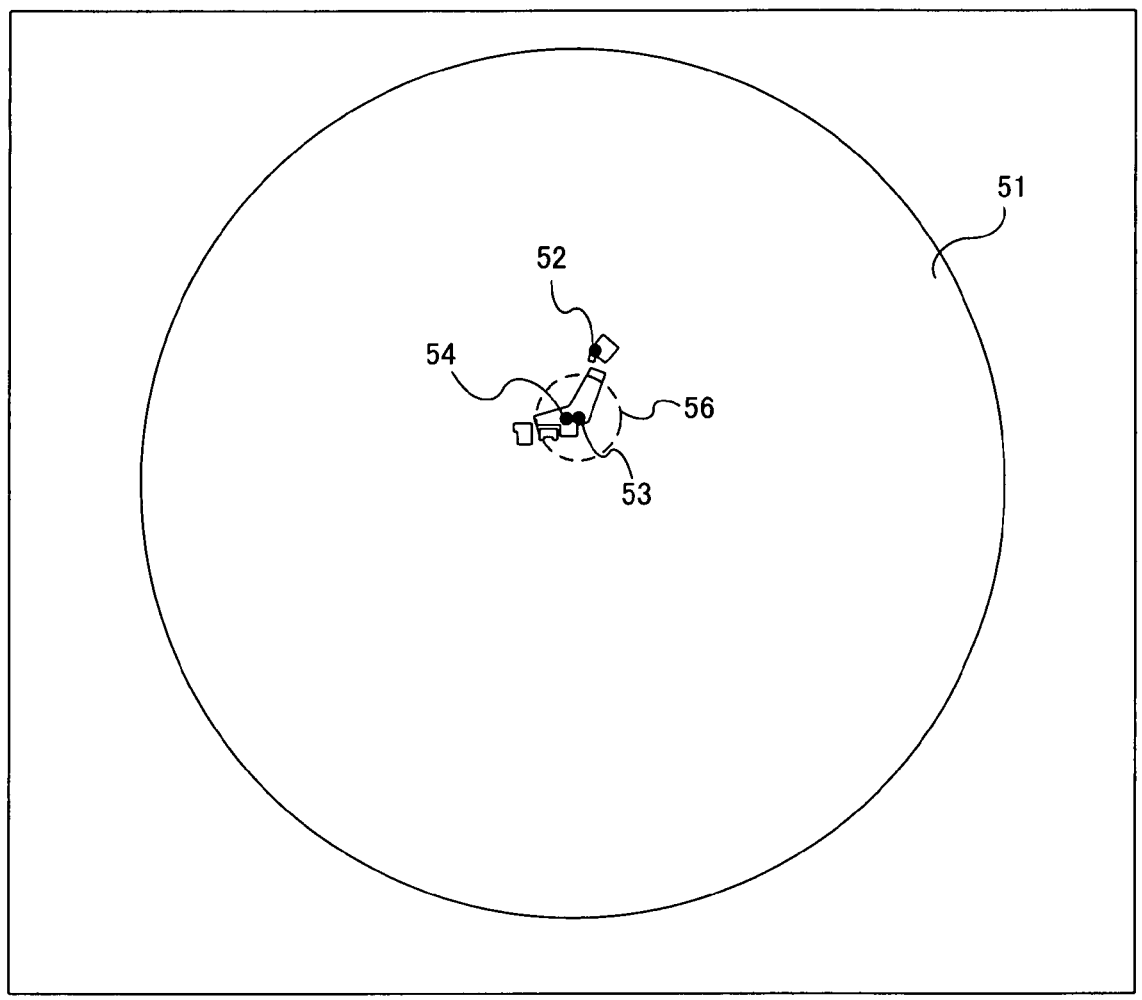
FIG. 10 is a diagram illustrating an image of the map 51 the scale of which is changed from the image of FIG. 8.

FIG. 8 is a diagram illustrating an image of a map 51 which is generated with a certain scale. FIG. 9 is a diagram illustrating an image of the map 51 the scale of which is changed from the image of FIG. 8 (the scale is reduced). In FIGS. 8 and 9, a map image in the vicinity of Japan is generated as an example. For example, three locations, Sapporo (news location 52), Tokyo (news location 53), and Kyoto (news location 54) are assumed as news locations. Although an entire image of the spherical map 51 is generated so that the image includes images of other countries in addition to Japan in FIG. 9, only Japan is indicated on the map 51 of FIG. 9 for the sake of simplicity.

As illustrated in FIGS. 8 and 9, the news locations 52 to 54 are present on the map 51, and news information is related to each of the news locations 52 to 54. Also, a reference region is set for each of the news locations 52 to 54. The reference region is a region which is set in a display region (in the map image) of the screen, and is determined based on a position where a news location is displayed. In this exemplary embodiment, the reference region is a region having a range within a predetermined distance r1 from the display position of a news location, i.e., a circular region having a radius of r1. In FIGS. 8 and 9, a reference region 55, a reference region 56, and a reference region 57 are set for the news location 52, the news location 53, and the news location 54, respectively.

After generating the image of the map 51, the game device 3 divides the news information related to the displayed news locations 52 to 54 into groups. In this exemplary embodiment, news locations having a distance therebetween which is smaller than a predetermined reference are set into the same group. Specifically, the game device 3 selects, as a reference location, a news location which is related to one piece of news information in accordance with a predetermined criterion. Thereafter, news information which is related to the reference location, and news information which is related to a news location which is present within a predetermined distance of r2 (distance in the display region) from the reference location, are set into one group. The game device 3 divides the pieces of news information into groups by repeatedly executing the process of selecting a reference location and the process of setting a group including news information related to the reference location. Note that the predetermined distance r2 has a value two times larger than that of the predetermined distance r1. In other words, when the reference regions of two news locations overlap each other, a distance in the display region between the two news locations is within the predetermined distance r2.

For example, in the case of the image of FIG. 8, there is no pair of news locations whose reference regions overlap each other, and therefore, the three news locations 53 to 55 are put into respective separate groups. Specifically, in FIG. 8, one group corresponds to one piece of news information, i.e., the following three groups are set: a group including the news information related to the news location 52 (Sapporo), a group including the news information related to the news location 53 (Tokyo), and a group including the news information related to the news location 54 (Kyoto).

On the other hand, in the case of the image of FIG. 9, the image of the map 51 is reduced (the scale of the map is reduced) as compared to FIG. 8. Therefore, a distance on the display between each news location is reduced as compared to the image of FIG. 8. As a result, in the image of FIG. 9, the reference regions 55 to 57 of the three news locations 52 to 54 overlap each other in the display region. Therefore, in the case of the image of FIG. 9, the pieces of news information related to the three news locations 52 to 54 are put into one group. As described above, in this exemplary embodiment, a plurality of pieces of news information related to respective news locations having distances on the display smaller than the predetermined distance r2 are put into one group.

After setting groups, the game device 3 sets a determination region for each group. The determination region is a region which is set in the display region of the screen, and is used to determine whether or not a group has been selected. Specifically, when a position designated by a cursor is within a determination region, the game device 3 determines that a group having the determination region has been selected. In this exemplary embodiment, the game device 3 sets a reference region which has been set for the reference location included in a group, as the determination region of the group. For example, in the case of the image of FIG. 8, the reference region 55 is set as a determination region for a group including the news information related to the news location 52, the reference region 56 is set as a determination region for a group including the news information related to the news location 53, and the reference region 57 is set as a determination region for a group including the news information related to the news location 54. On the other hand, in the case of the image of FIG. 9, for example, if the news location 53 is assumed to be the reference location, the reference region 56 is set as a determination region for a group including the pieces of news information related to the news locations 52 to 54 (see FIG. 10).

Figure 11:
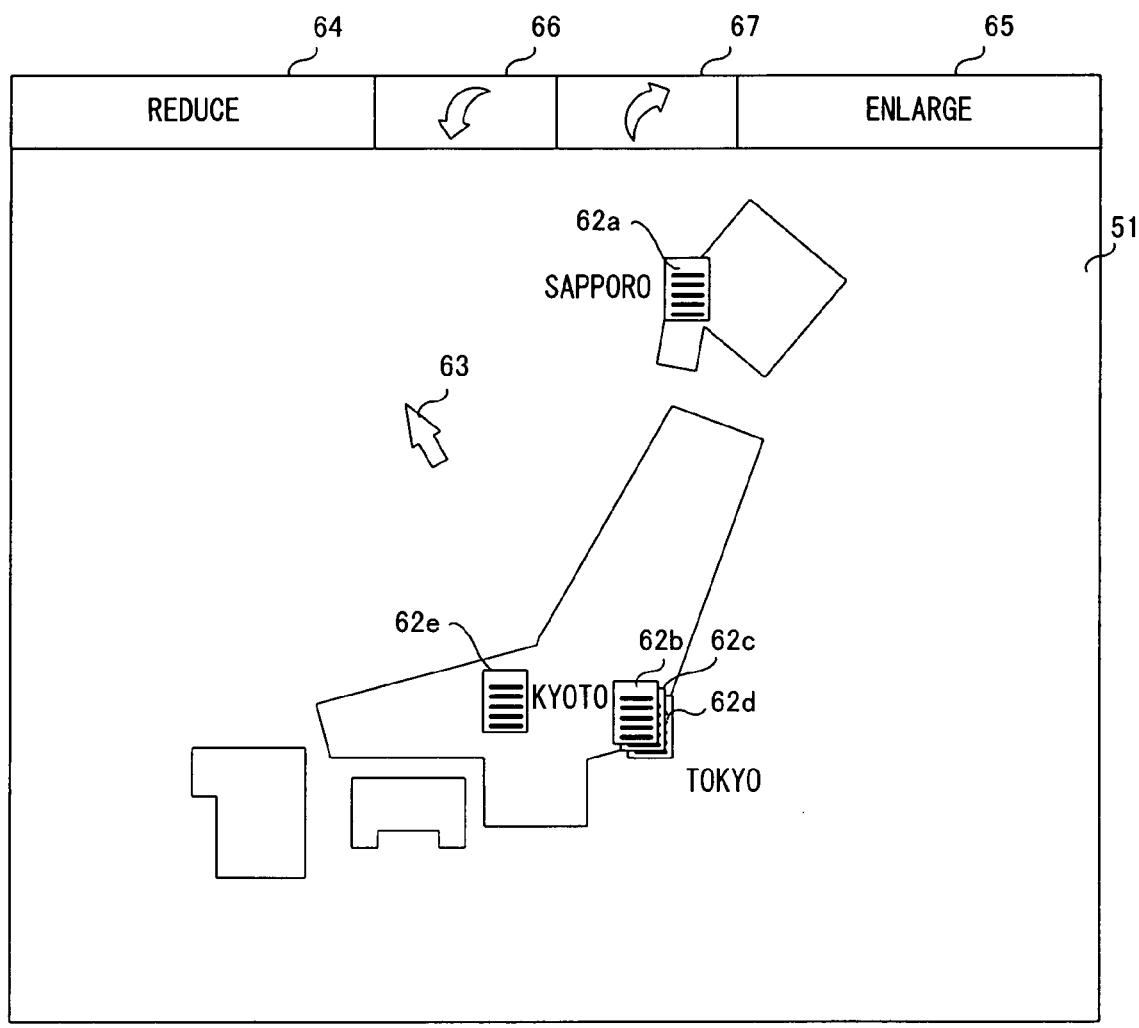
FIG. 11 is a diagram illustrating an exemplary image displayed on a screen of a television 2 in a map display mode.

After a group is set as described above, the game device displays, on the television 2, an icon indicating news information together with the image of the map 51. FIG. 11 is a diagram illustrating an exemplary image displayed on the screen of the television 2 in the map display mode. Note that FIG. 11 illustrates an image displayed on the screen of the television 2 when the map image of FIG. 8 is displayed. As illustrated in FIG. 11, the map 51, icons 62a to 62e, a cursor 63, and various buttons 64 to 67 are displayed on the screen of the television 2. Note that, in FIG. 11, the icon 62a indicates a piece of news information related to Sapporo, the icons 62b, 62c and 62d indicate pieces of news information related to Tokyo, and the icon 62e indicates a piece of news information related to Kyoto.

In this exemplary embodiment, icons are displayed together at the position of a reference location for each group. Specifically, when a plurality of pieces of news information are included in one group, icons for the pieces of news information are displayed together. Even when only one piece of news location is included in one group, and a plurality of pieces of news information are related to the news location, icons for the pieces of news information are displayed together.

Figure 12:
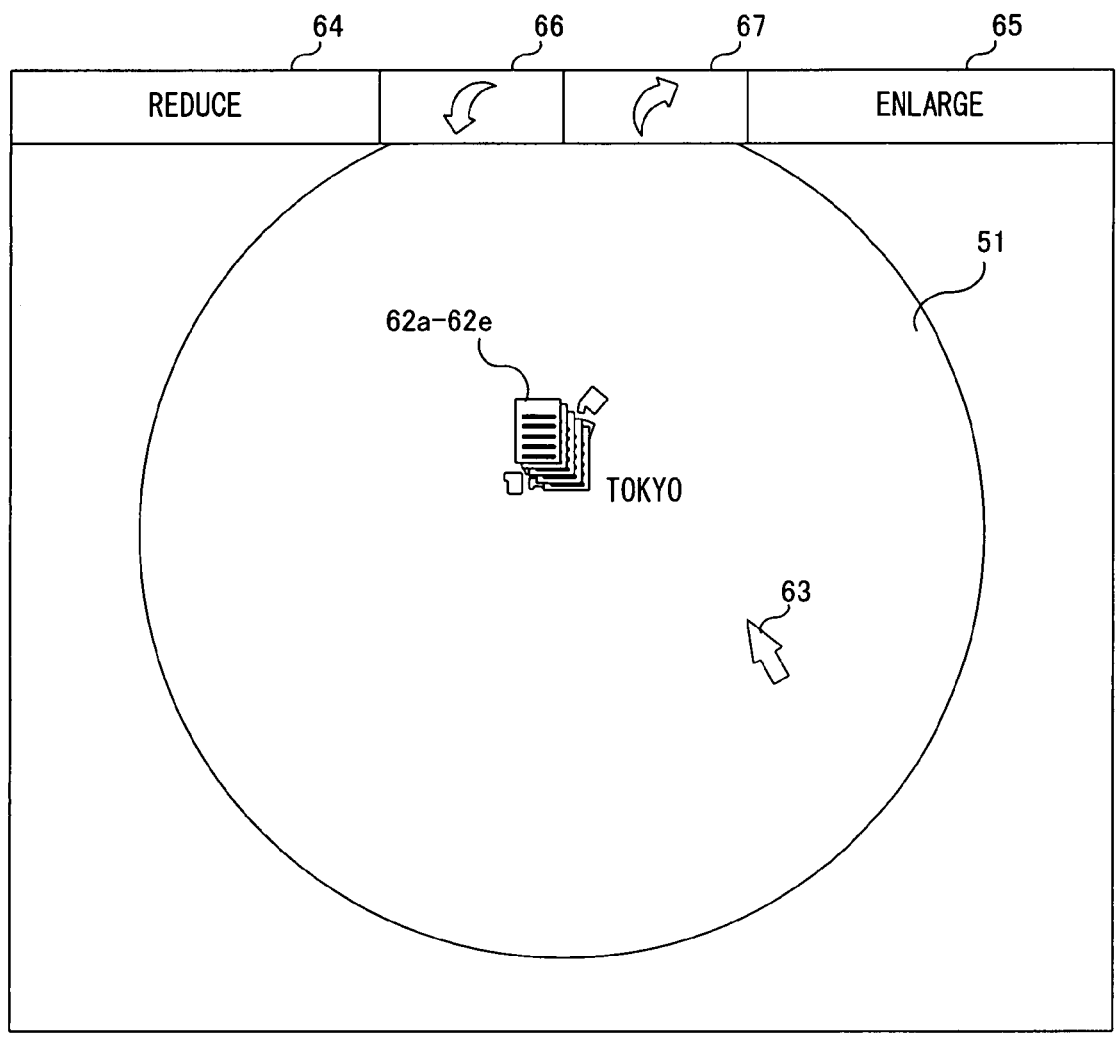
FIG. 12 is a diagram illustrating an exemplary image displayed on the screen of the television 2 in the map display mode.
Figure 13:
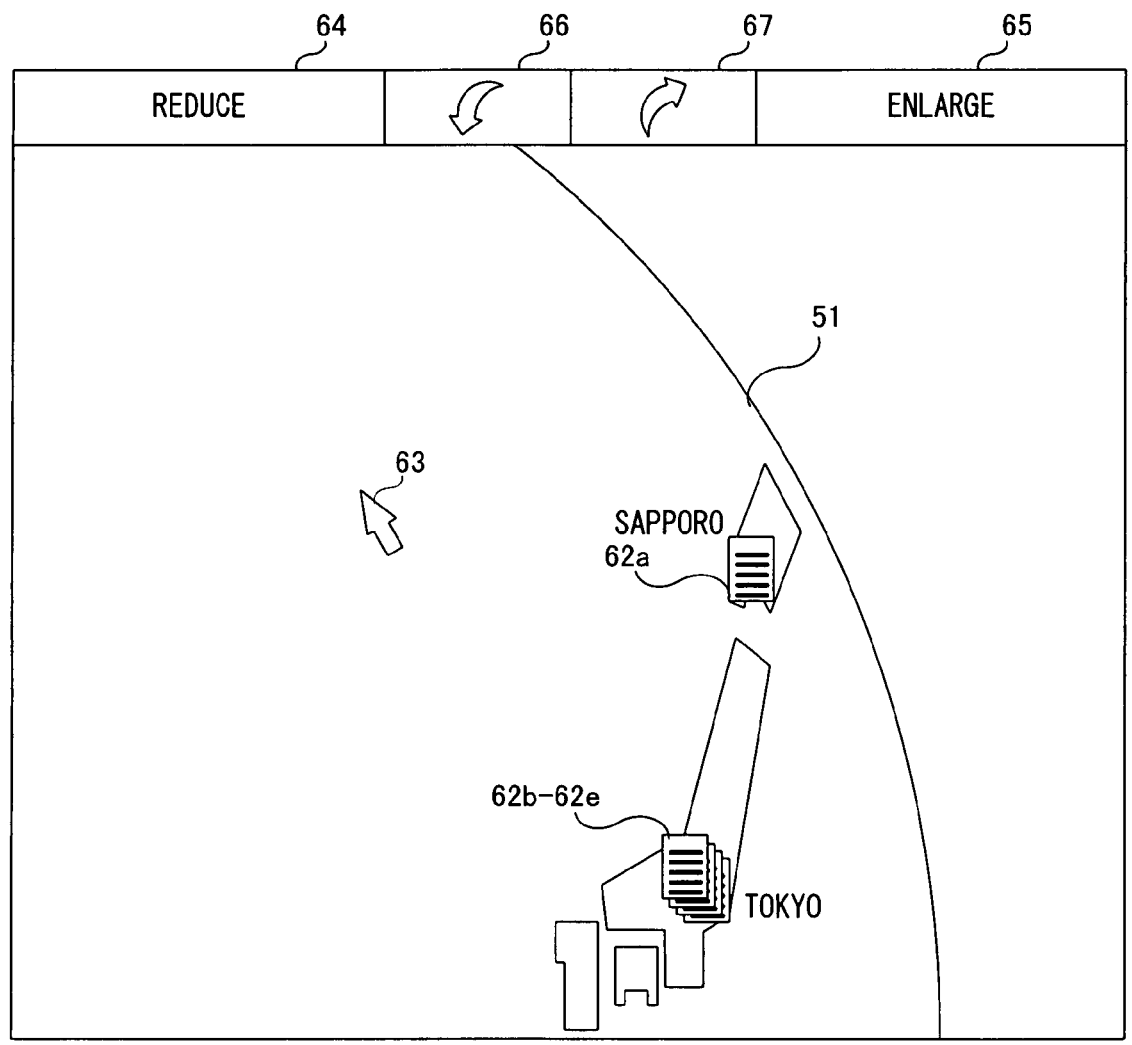
FIG. 13 is a diagram illustrating an exemplary image displayed on the screen of the television 2 in the map display mode.

For example, in FIG. 11, since three pieces of news information are related to Tokyo, the three icons 62b, 62c and 62d are displayed together for Tokyo. In FIG. 11, the three icons 62b, 62c and 62d are displayed at respective display positions which are shifted by a predetermined distance relative to each other while overlapping each other. On the other hand, FIG. 12 illustrates an image displayed on the screen of the television 2 when the map image of FIG. 9 is generated. In FIG. 12, the three news locations Sapporo, Tokyo and Kyoto are put into one group, so that the icons 62a to 62e indicating the pieces of news information related to these news locations are displayed together. Note that, in FIG. 12, the reference location is set as Tokyo. FIG. 13 is a diagram illustrating another exemplary image displayed on the screen of the television 2 in the map display mode. FIG. 13 illustrates an image displayed when the news information related to Sapporo is put into one group, and the pieces of news information related to Tokyo and Kyoto are put into another group. In FIG. 13, the icon 62a indicating the news information related to Sapporo is displayed singly, and the icons 62b to 62e indicating the pieces of news information related to Tokyo or Kyoto are displayed together. As described above, in this exemplary embodiment, since icons included in one group are displayed together, the user can readily recognize the group thus set.

Also, in this exemplary embodiment, as illustrated in FIGS. 11 to 13, the place name (Sapporo, Tokyo, and Kyoto in the example of FIGS. 11 to 13) of the reference location of each group for which an icon is displayed is displayed in relation to the icon (in the vicinity of the icon).

The cursor 63 is displayed at the pointing position calculated by the game device 3. In this exemplary embodiment, the user moves the cursor 63 on the screen using the controller 5, and designates a position on the screen using the cursor 63. The designation of a position on the screen using the cursor 63 is effected by, for example, pressing down a predetermined button (e.g., the A button 32*d*) while the position is being pointed by the cursor 63. In this exemplary embodiment, various operations are performed by designating a position on the screen using the cursor 63. For example, an operation of selecting a group is performed using the cursor 63. Also, in this exemplary embodiment, an operation of moving (scrolling) the map 51 can be performed in the map display mode. Although will be described below in detail, this operation is also performed using the cursor 63.

Also, in this exemplary embodiment, an operation of enlarging or reducing the map 51 (changing the scale of the map 51) and an operation of changing the angle of depression of the virtual camera can be performed in the map display mode. Although will be described below in detail, the various buttons 64 to 67 illustrated in FIG. 11 and the like are buttons for performing these operations. The enlargement button 65 is a button representing a command to enlarge the map 51, and the reduction button 64 is a button representing a command to reduce the map 51. The angle-of-depression increasing button 67 is a button representing a command to increase the angle of depression of the virtual camera, and the angle-of-depression decreasing button 66 is a button representing a command to decrease the angle of depression of the virtual camera. Note that the angle of depression of the virtual camera refers to an angle between a line of sight of the virtual camera and a map surface at a portion where the line of sight intersects the map surface. The user can issue the commands corresponding to the buttons 64 to 67 by selecting the buttons 64 to 67 using the cursor 63.

As described above, icons indicating news information are displayed along with a map in the map display mode. Note that, as described above, in the map display mode, the operation of enlarging or reducing the map 51 and the operation of changing the angle of depression of the virtual camera can be performed. When these operations are performed, a distance on the display between news locations is changed. Therefore, in this exemplary embodiment, the game device 3 performs grouping on a frame-by-frame basis to change groups of news information in real time. As a result, the way of displaying an icon, i.e., whether the icon is displayed singly or together with some other icons, is changed in real time.

In the map display mode, the user selects a desired group while moving a map or changing the scale of the map. A group is selected using the cursor 63. Specifically, after the cursor 63 is used to designate a position on the screen, the game device 3 determines whether or not the designated position is within the determination region of any group. When the designated position is within a determination region of any group, it is determined that a group having the determination region has been selected.

After a group has been selected, the game device 3 presents a list of news information included in the selected group to the user. Specifically, an imaging representing the news information list is displayed on the television 2. Thereby, the processing mode is changed from the map display mode to the list display mode.

Figure 14:
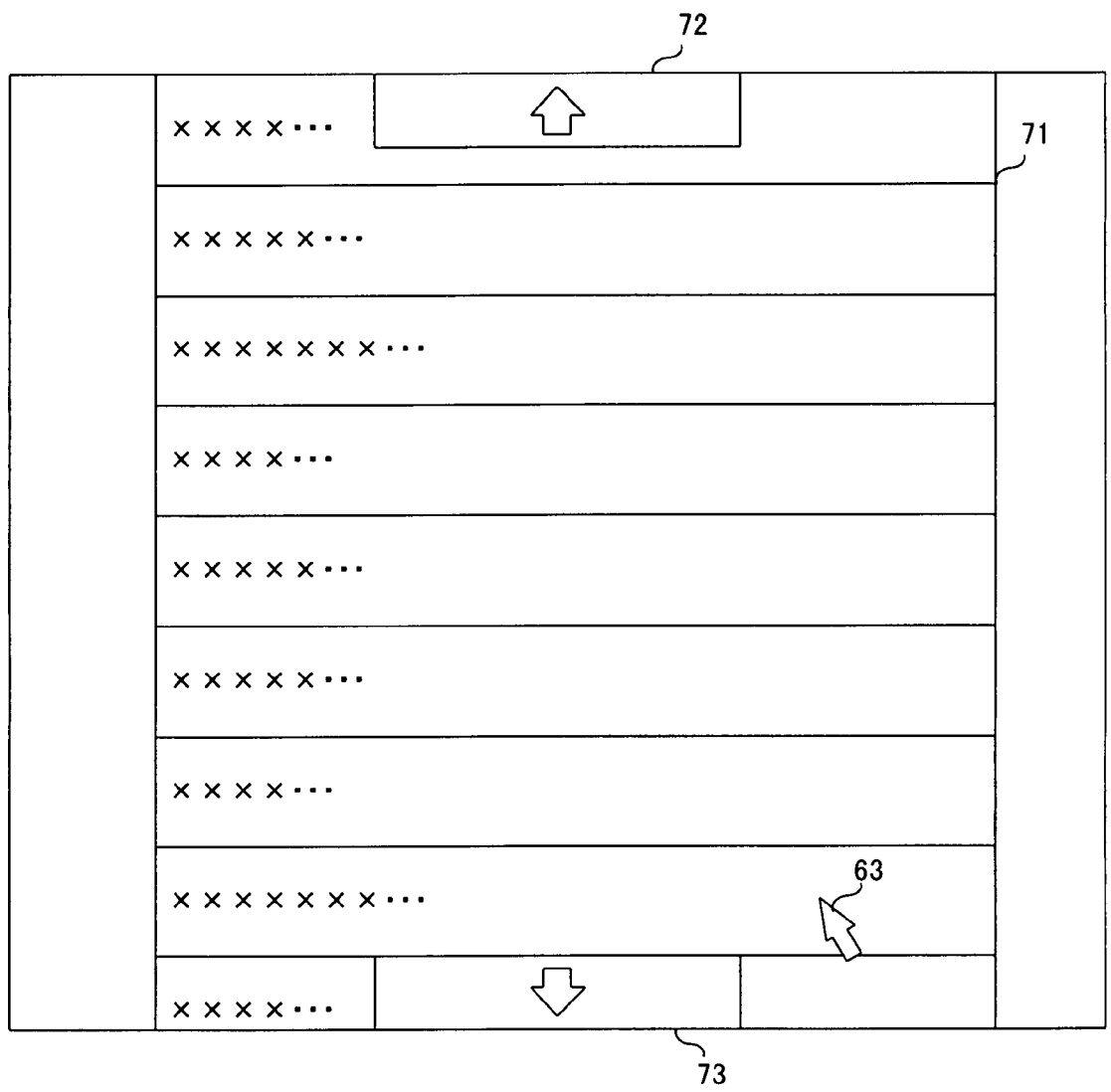
FIG. 14 is a diagram illustrating an exemplary image displayed on the screen of the television 2 in a list display mode.

FIG. 14 is a diagram illustrating an exemplary image displayed on the screen of the television 2 in the list display mode. On the screen of FIG. 14, the cursor 63, a list image 71, a scroll-up button 72, and a scroll-down button 73 are displayed.

The list image 71 represents a list of news information included in a selected group. Specifically, the list image 71 includes an image (represented by xxx . . . in FIG. 14) representing an entry of news for each piece of news information. Note that, in this exemplary embodiment, when there are a plurality of pieces of news information to be displayed on a news list, entry images of the pieces of news information are vertically arranged in a predetermined order, and a predetermined number of entry images (nine in FIG. 14) are simultaneously displayed on the screen.

The scroll-up button 72 and the scroll-down button 73 are each a button representing a command to scroll the list image 71. Specifically, the scroll-up button 72 represents a command to scroll the list image 71 in an upward direction of the screen by a length corresponding to one entry image. The scroll-down button 73 represents a command to scroll the list image 71 in a downward direction of the screen by the length corresponding to one entry image. The user can issue the commands corresponding to the buttons 72 and 73 by designating the buttons 72 and 73 using the cursor 63. As described above, by scrolling the list image 71 upward or downward, all pieces of news information related to a news location (s) included in a selected group can be displayed.

In the list display mode, the user selects a piece of news information whose contents the user wants to read. Desired news information is selected by, for example, designating a field (entry image) in which the news information is displayed, of fields in the list image 71, using the cursor 63, though news information may be selected in any manner. After news information is selected, the game device 3 presents the contents of the selected news information to the user. Specifically, a text, an image or the like of the news information is displayed on the television 2. Thereby, the processing mode is changed from the list display mode to the text display mode.

Figure 15:
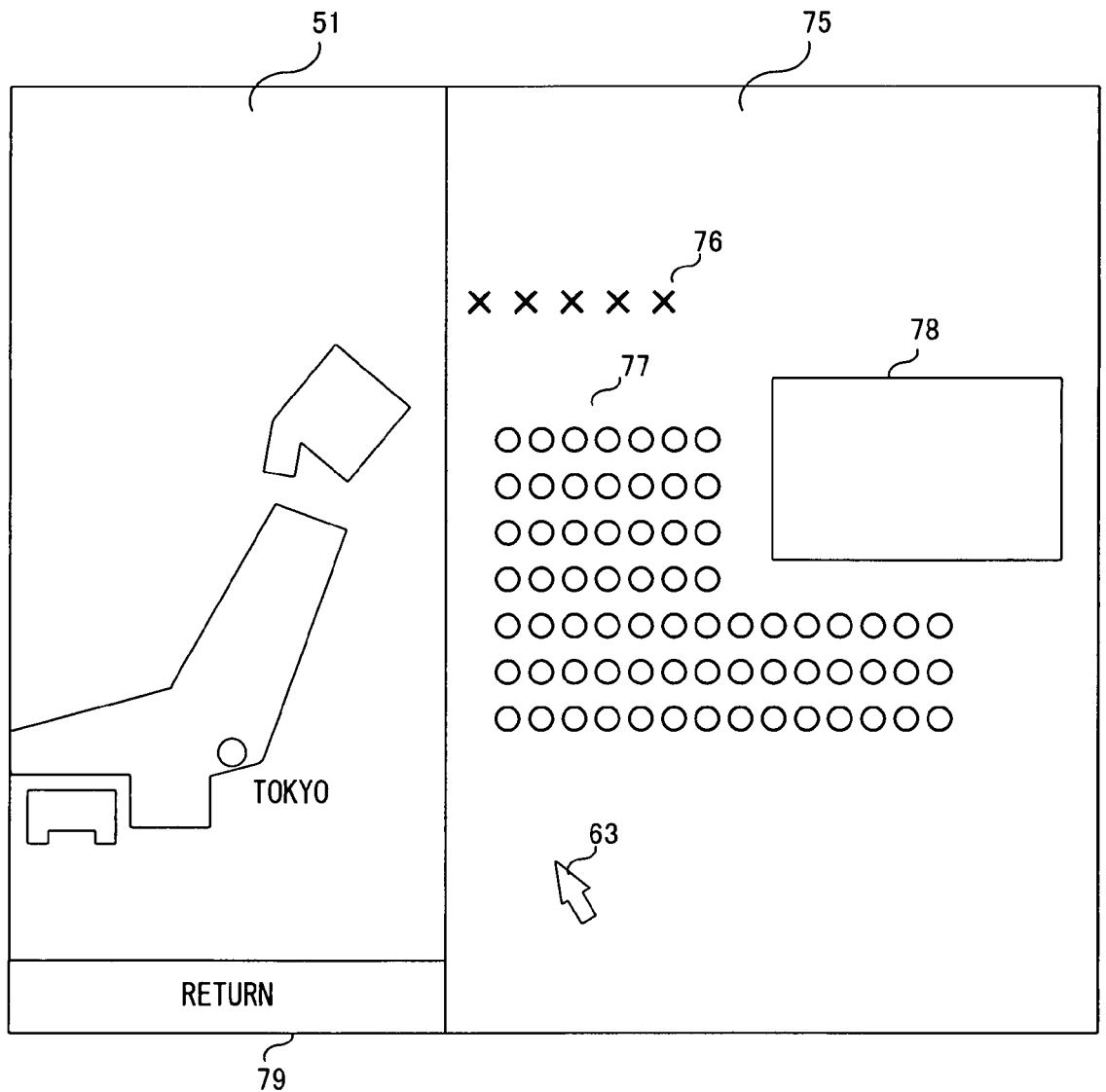
FIG. 15 is a diagram illustrating an exemplary image displayed on the screen of the television 2 in a text display mode.

FIG. 15 is a diagram illustrating an exemplary image displayed on the screen of the television 2 in the text display mode. On the screen of FIG. 15, the map 51, the cursor 63, a news content image 75, and a return button 79 are displayed. As illustrated in FIG. 15, a text of selected news information is displayed in the text display mode.

The news content image 75 includes the contents of the selected news information, i.e., an entry 76, a text 77, and a news image 78. News is presented to the user by displaying the news content image 75. Also, in this exemplary embodiment, the map 51 is displayed on the screen in addition to the news content image 75 of the selected news information. In the text display mode, a mark (open circle in FIG. 15) and a place name (Tokyo in FIG. 15) indicating a news location to which the selected news information is related are displayed on the map 51. With this image, the user can know to what news location news which the user is reading is related. The return button 79 is a button representing a command to return to the map display mode. By selecting the return button 79 using the cursor 63, the user can cause the screen to be displayed in the map display mode (FIG. 11).

As described above, in this exemplary embodiment, pieces of news information (or news locations) are divided into groups, depending on distances on the display between news locations (FIG. 12). For example, when a plurality of news locations are displayed in a dense manner, pieces of news information related to these news locations are put into one group. Initially, a group is selected using the cursor 63. When a group is selected, a list of news information included in the selected group is displayed (FIG. 14), and the contents of news are displayed by selecting a piece of news information from the list (FIG. 15). By the processes above, according to this exemplary embodiment, even when a plurality of news locations are displayed in a dense manner, it is possible to prevent the user from erroneously selecting a news location (news information) which is not intended by the user, thereby making it possible to readily perform the operation of selecting news information.

(Details of Process in Game Device 3)

Figure 16:
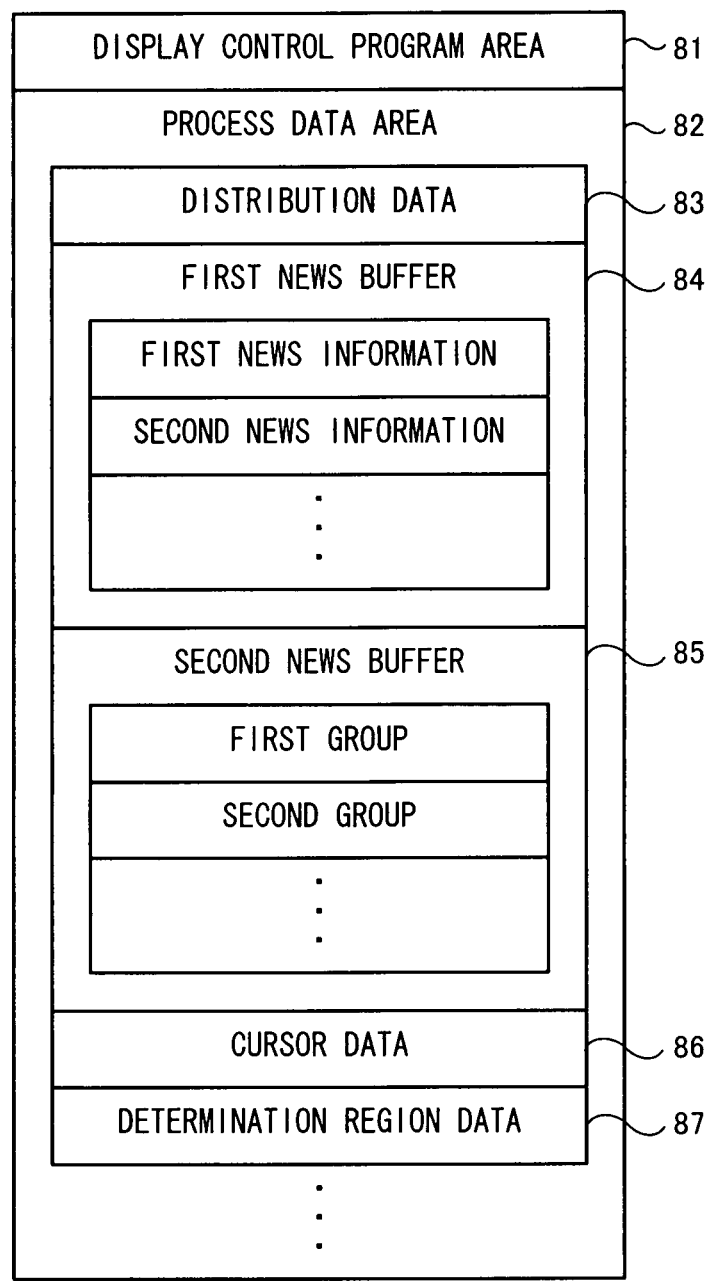
FIG. 16 is a diagram illustrating a storage area provided in a storage device.

Next, a process executed in the game device 3 will be described in detail. Firstly, main data which is used in the process in the game device 3 will be described using FIGS. 16 to 18. FIG. 16 is a diagram illustrating a storage area provided in a storage device (the main memory 13, the flash memory 18, etc.) of the game device 3. As illustrated in FIG. 16, a display control program area 81, a process data area 82, and the like are provided in the storage device of the game device 3.

The display control program area 81 is an area for storing a display control program according to certain exemplary embodiments. The display control program is a program for causing the game device 3 to execute a process of displaying a map and news information acquired from an external server. In this exemplary embodiment, the display control program is assumed to be previously stored in the storage device of the game device 3. In other exemplary embodiments, the program may be stored on the optical disc 4, and the game device 3 may read the program from the optical disc 4 with appropriate timing.

Figure 19:
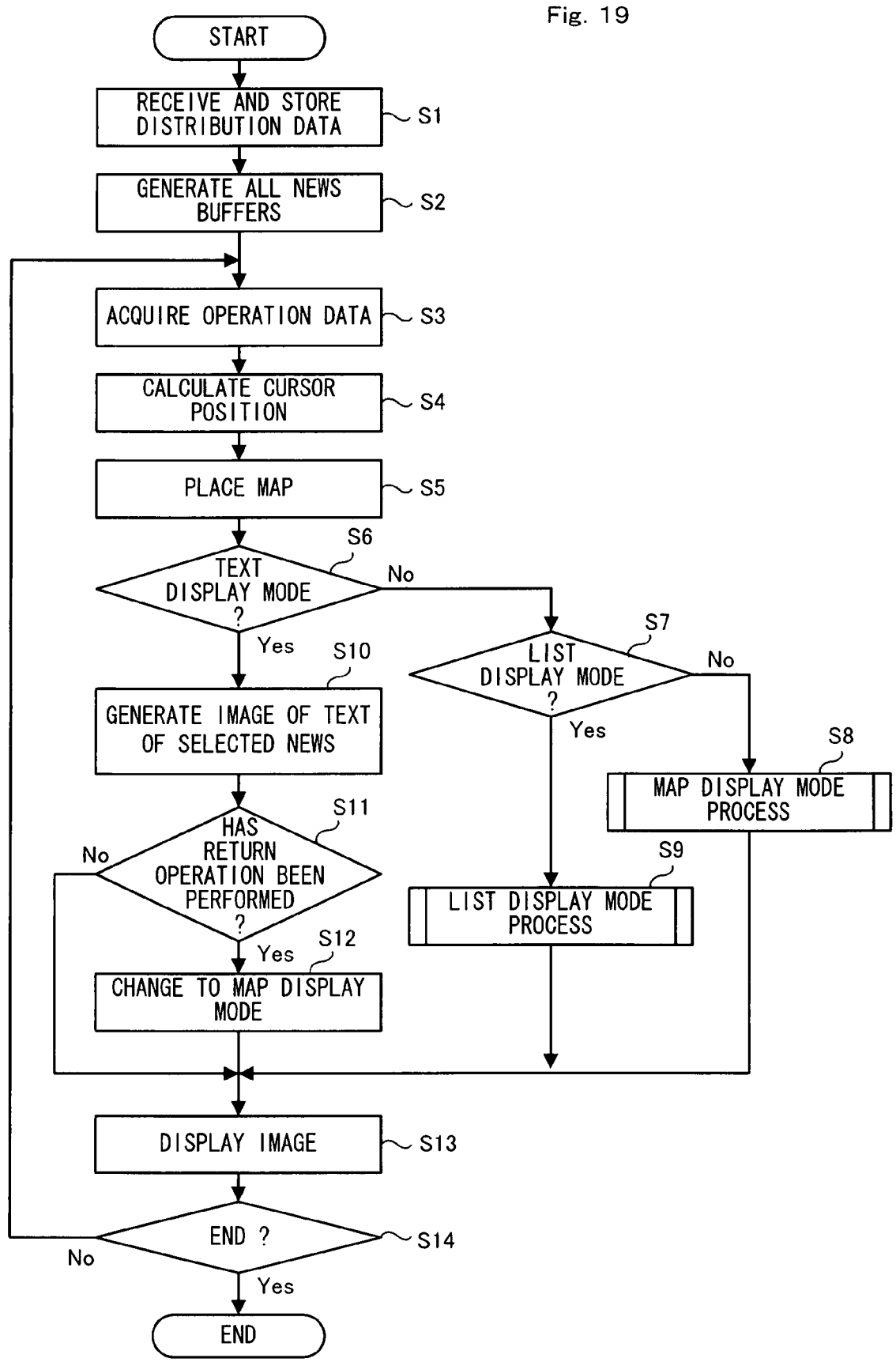
FIG. 19 is a main flowchart illustrating a flow of a process executed in the game device 3.

The process data area 82 is an area for storing data which is used in the process executed in the game device 3 (see FIG. 19 or the like). The process data area 82 stores distribution data 83, cursor data 86, and determination region data 87, and is also provided with a first news buffer 84 and a second news buffer 85. Note that the process data area 82 stores data required for the process, such as operation data acquired from the controller 5, data of a map image, map data including data indicating a position on a map of each news location, and the like, in addition to the data of FIG. 16.

Figure 17:
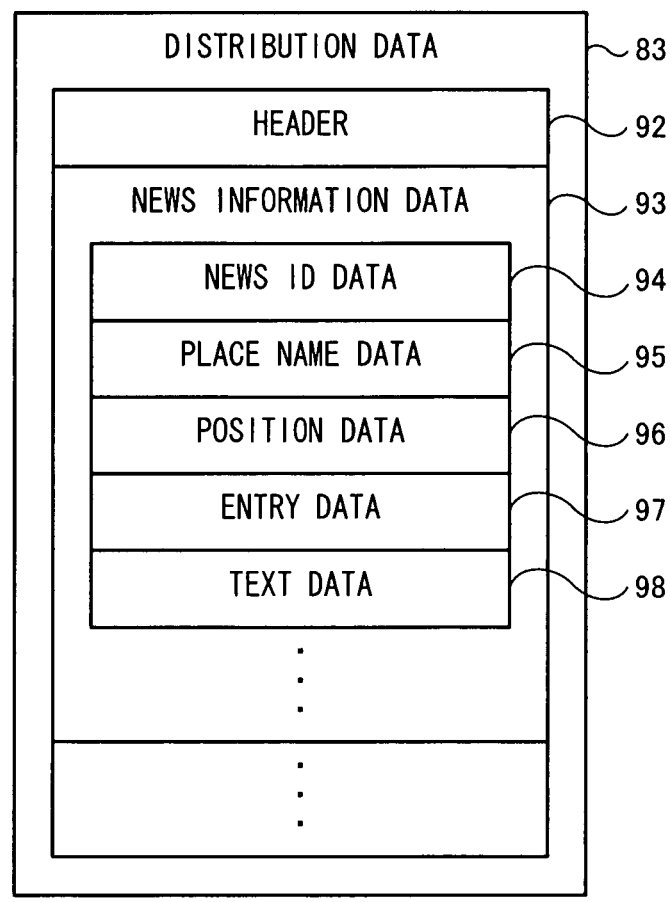
FIG. 17 is a diagram illustrating exemplary distribution data.

The distribution data 83 is data which is distributed and acquired from an external server, including data of news information related to a news location. FIG. 17 is a diagram illustrating exemplary distribution data. As illustrated in FIG. 17, the distribution data 83 includes a header 92 and news information data 93. The header 92 includes information required for the process, such as, for example, the number of pieces of news information included in the distribution data, the date and time when the distribution data is distributed, and the like.

The news information data 93 is data which indicates a piece of news information. Note that distribution data typically includes a plurality of pieces of news information data. The news information data 93 includes news ID data 94, place name data 95, position data 96, entry data 97, text data 98, and the like. The news ID data 94 indicates a number for identifying news information. The place name data 95 indicates the place name of a news location related to the news information. The position data 96 indicates a position on a map of the news location related to the news information. In this exemplary embodiment, since the map is a world map in the shape of a sphere, a position on the map is represented by a latitude and a longitude. Specifically, the position data 96 indicates the latitude and the longitude of the news location related to the news information. In other exemplary embodiments, the position data 96 may represent three-dimensional or two-dimensional coordinates, or alternatively, if there is a previously defined correspondence between place names and positions, the place name data 95 may be converted into position data. The entry data 97 indicates the entry of the news information. The text data 98 indicates the text of the news information. Note that the news information data may include data indicating the date, data of video or an image relating to the news information in addition to the data of FIG. 17.

Note that the data structure of the distribution data is not limited to that described above, and data in which a location on a map is related to news information in any manner may be included. For example, in other exemplary embodiments, the data structure may be such that place name data and news information data may be separately included in distribution data. In this case, the news information data includes a pointer designating the place name data included in the distribution data. With such a data structure, it is not necessary to provide place name data in each piece of news information data, so that a plurality of pieces of news information data do not duplicatively include the same place name data, thereby making it possible to reduce the data amount of the distribution data.

Referring back to FIG. 16, the first news buffer 84 is a buffer area for storing all pieces of news information currently stored in the main memory 13. The pieces of news information stored in the first news buffer 84 are stored in a predetermined order (e.g., in order of the date of news (latest first)). Hereinafter, news information stored at the n-th (n is an integer of 1 or more) place as counted from the head is referred to as "n-th news information". Note that, in this exemplary embodiment, the same data as news information data included in distribution data is not stored in the first news buffer 84, and actually, a pointer for designating the news information data stored as the distribution data is stored in the first news buffer 84. For example, currently stored pieces of news information data are assigned respective index numbers, and a pointer designates a corresponding index number. By using a pointer as in this exemplary embodiment, a memory area required for the first news buffer 84 can be reduced.

Figure 18:
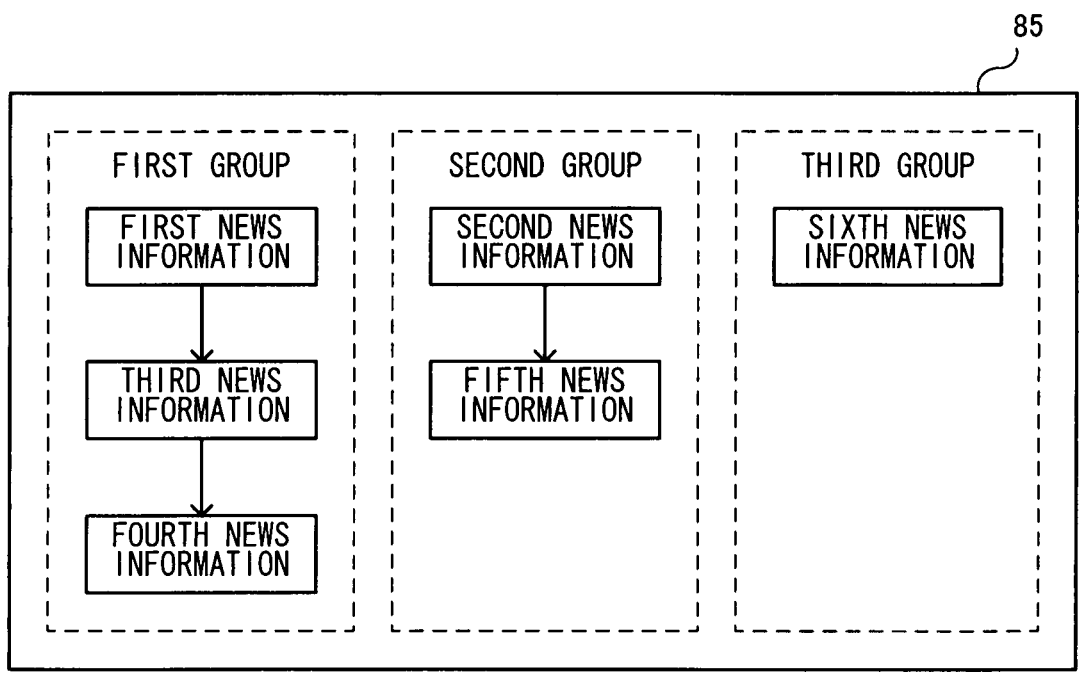
FIG. 18 is a diagram conceptually illustrating a data structure of data stored in a second news buffer 85.

The second news buffer 85 is a buffer area for storing a group including news information to be displayed on the screen. FIG. 18 is a diagram conceptually illustrating a data structure of data stored in the second news buffer 85. As illustrated in FIG. 18, the second news buffer 85 stores a plurality of pieces of news information (first to sixth news information in FIG. 18), which are divided into one or more group. Hereinafter, a group generated at the n-th (n is an integer of 1 or more) time is referred to as an "n-th group". Also, pieces of news information included in one group are connected in sequence with a link structure. For example, in FIG. 18, the first group includes first, third and fourth news information, which are connected in order of first, third and fourth. Similarly, the second group includes second and fifth news information, which are connected in order of second and fifth. Also, the third group includes only sixth news information.

Although will be described below in detail, in the second news buffer 85, pieces of news information related to news locations included in the same group are put into the same group. Therefore, in this exemplary embodiment, division of pieces of news information into groups means division of news locations into groups.

The data structure as illustrated in FIG. 18 can be achieved using a pointer. In this exemplary embodiment, the second news buffer 85 stores a news information designating pointer for designating news information data stored as distribution data, as an element (data) corresponding to the news information data, and a next element designating pointer for designating the next element connected to that element. Note that the element may include data indicating the head of the link. Using this data, it is possible to readily search for news information which is the head of the link, from a plurality of pieces of news information stored in the second news buffer 85.

The cursor data 86 is data indicating a position of a cursor in the display region (on the screen). The determination region data 87 is data indicating a position of the determination region in the display region. The cursor data 86 and the determination region data 87 are used to determine whether or not a group including a location on a map has been selected by an operation using the cursor.

Next, a flow of the process executed in the game device 3 will be described in detail with reference to FIGS. 19 to 24. FIG. 19 is a main flowchart illustrating the flow of the process executed in the game device 3. When the game device 3 is powered on, the CPU 10 of the game device 3 executes a boot program stored in a boot ROM (not show), thereby initializing each unit, such as the main memory 13 and the like. Thereafter, the CPU 10 starts execution of the display control program. The flowchart of FIG. 19 indicates a process executed after the completion of the above-described process.

Initially, in step S1, the CPU 10 receives distribution data distributed from a server via a network, and stores the received distribution data as the distribution data 83 into the main memory 13. The distribution data includes one or more pieces of news information data. Also, distribution data may be regularly acquired from a server and stored into the flash memory 18, and in step S1, the distribution data may be transferred from the flash memory 18 to the main memory 13. With such a configuration, latest information can be invariably acquired.

In the following step S2, the CPU 10 generates a first news buffer. Specifically, the pieces of news information included in the distribution data stored in step S1 are stored into the first news buffer 84. Note that, as described above, the pieces of news information are sorted in a predetermined order (e.g., in order of the date of news (latest first)) and stored in the first news buffer 84.

After steps S1 and S2, a process loop of steps S3 to S14 is repeatedly executed. Note that the process loop is executed at a rate of one loop per frame time (e.g., 1/60 sec).

Note that, in this exemplary embodiment, a first news buffer which is generated based on a piece of distribution data received once is used to execute a process of presenting news information to the user (steps S3 to S14 described below). Here, in other exemplary embodiments, the process may be executed using a first news buffer which is generated based on a plurality of pieces of distribution data. For example, a server may transmit distribution data to the game device 3 at predetermined time intervals (e.g., each interval is one hour), and the game device 3 may store a predetermined number of pieces of distribution data (e.g., 24 pieces of distribution data (for one day)) sequentially from the latest. In this case, old distribution data is erased.

In step S3, the CPU 10 acquires operation data from the controller 5. Specifically, the communication unit 16 receives the operation data transmitted from the controller 5, and the received operation data is stored into the main memory 13. Thereby, data indicating current operation states of the operation buttons 32a to 32i, and marker coordinate data indicating current marker coordinates are stored into the main memory 13.

In the following step S4, the CPU 10 calculates a position where a cursor is displayed. As described above, the cursor is displayed at a pointing position, and the pointing position is calculated using the marker coordinate data. Data indicating the calculated pointing position is stored as the cursor data 86 into the main memory 13. Note that any algorithm for calculating a pointing position may be used as long as it can calculate a pointing position on the screen from a captured image. As an example, it is contemplated that the pointing position is calculated using an algorithm described below.

Hereinafter, an exemplary method for calculating a pointing position will be described. Initially, the CPU 10 calculates a middle point between two marker coordinate points indicated by the marker coordinate data stored in the main memory 13. The position of the middle point is represented by an xy coordinate system for representing positions on a plane corresponding to a captured image. In the xy coordinate system, the origin is located at an upper left corner of the captured image, the positive y-axis direction is a downward direction, and the positive x-axis direction is a rightward direction. Next, the CPU 10 converts coordinates indicating the position of the middle point into coordinates in a coordinate system (x'y' coordinate system) for representing positions on the screen of the television 2. Note that, if the x'y' coordinate system is such that the origin is located at an upper left corner of the screen, the positive y-axis direction is a downward direction, and the positive x-axis direction is a rightward direction, the above-described conversion can be performed as follows. Specifically, the sign of the x coordinate of the middle point is reversed and scaled by a predetermined factor (e.g., the length in the x-axis direction of the captured image is changed to be equal to the length in the x'-axis direction of the screen of the television 2), thereby making it possible to obtain the x' coordinate of the pointing position. Also, the y coordinate of the middle point is scaled by a predetermined factor (e.g., the length in the y-axis direction of the captured image is changed to be equal to the length in the y'-axis direction of the screen of the television 2), thereby making it possible to obtain the y' coordinate of the pointing position. A position indicated by the x' and y' coordinate values thus calculated represents the pointing position. Alternatively, as an exemplary method for calculating a pointing position more accurately is as follows. The middle point between the two marker coordinate points is rotated around a center of the captured image so that a vector connecting the two marker coordinate points is parallel to the y axis, and the middle point thus rotated is subjected to the above-described conversion process. By executing a correction process employing such rotation, the pointing position can be accurately calculated even when the controller 5 is tilted or the like.

In S5 following step S4, the CPU 10 places a spherical map object in a three-dimensional virtual space. Note that the process of placing the map object may not be executed on a frame-by-frame basis, and may be executed only with appropriate timing where the process is required (e.g., timing with which a map is displayed, timing with which the map object is changed).

In step S6, the CPU 10 determines whether or not a current process mode is the text display mode. In this exemplary embodiment, the process mode of the game device 3 is set as any of the map display mode, the list display mode, and the text display mode. During the start of the process of FIG. 19, the process mode of the game device 3 is set as the map display mode. When the determination result of step S6 is positive, a process of step S10 below is executed. On the other hand, when the result of determination in step S6 is negative, a process of step S7 is executed.

In step S7, the CPU 10 determines whether or not the current process mode is the list display mode. When the determination result of step S7 is positive, a process of step S9 described below is executed. On the other hand, when the determination result of step S7 is negative, i.e., the current process mode is the map display mode, a process of step S8 will be described.

In step S8, a process in the map display mode (map display mode process) is executed. Hereinafter, the map display mode process will be described in detail with reference to FIG. 20.

Figure 20:
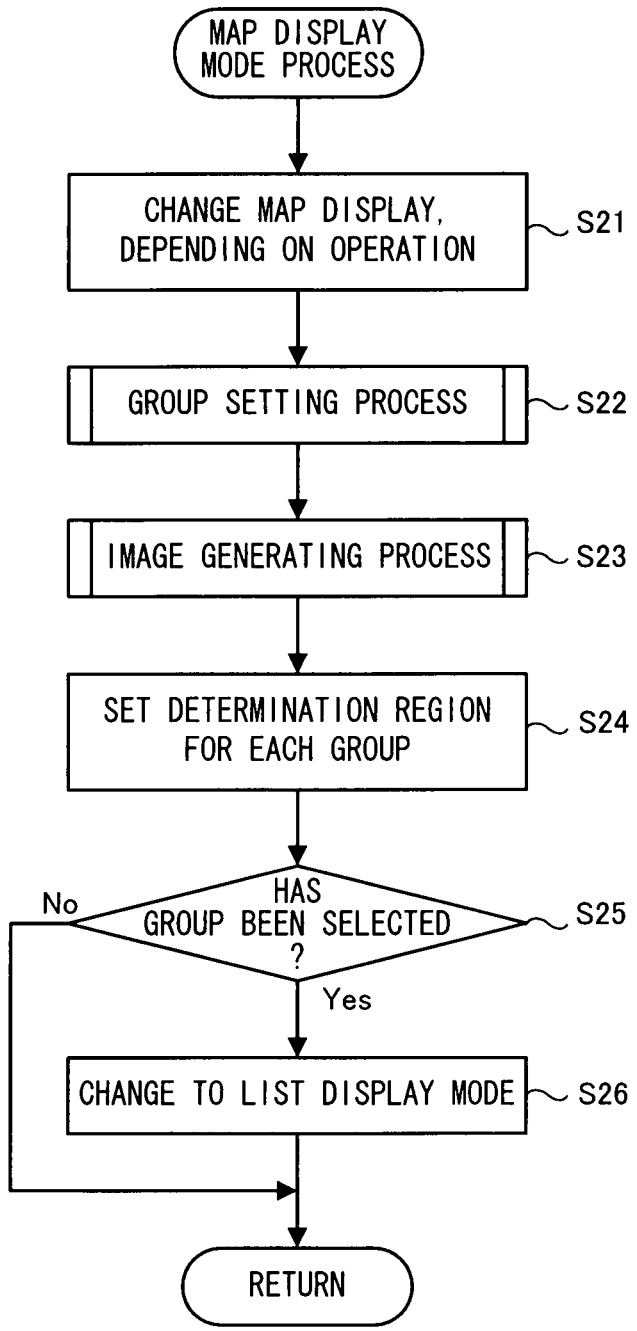
FIG. 20 is a flowchart illustrating a flow of a map display mode process (step S8) of FIG. 19.

FIG. 20 is a flowchart illustrating a flow of the map display mode process (step S8) of FIG. 19. In the map display mode process, initially, in step S21, the CPU 10 changes the display form of a map, depending on an operation by the controller 5. Specifically, the CPU 10 changes a position, an orientation, and a visual field angle of the virtual camera so that the map is moved, enlarged or reduced, or an angle of a ground surface with respect to the line of sight of the virtual camera is changed. Thereby, the map is moved, enlarged or reduced, and the angle of depression of the virtual camera is changed, so that the distance on the display between news locations may be changed.

The map is moved in accordance with an operation using a cursor. Specifically, the movement operation is performed by pressing down a predetermined button (e.g., the A button 32*d*) when the cursor is positioned in a region in which the map is displayed, and moving the cursor while pressing down the predetermined button. Specifically, the CPU 10 moves the virtual camera along a surface of the spherical map, depending on a direction in which the cursor has been moved. Thereby, the map displayed on the screen is scrolled, depending on the direction in which the cursor has been moved. For example, when the cursor 63 is moved leftward while pressing down the predetermined button, the map is scrolled leftward. Note that the game device 3 can calculate the rotation around the Z axis of the controller 5 using the marker coordinate data. Therefore, in other exemplary embodiments, the map may be rotated, depending on the rotation around the Z axis of the controller 5.

The map is enlarged or reduced, depending on the designation of the enlargement button 65 or the reduction button 64 of FIG. 11 by the cursor. Specifically, the CPU 10, when the enlargement button 65 is designated by the cursor, moves the virtual camera to approach the surface of the spherical map, and when the reduction button 64 is designated by the cursor, moves the virtual camera to go away from the surface of the spherical map. Alternatively, instead of changing the position of the virtual camera, the visual field angle of the virtual camera may be changed. As described above, the map is enlarged or reduced, depending on the designation of the enlargement button 65 or the reduction button 64. Alternatively, the CPU 10 may enlarge the map in response to the plus button 32*g* of the controller 5 being pressed down, and reduce the map in response to the minus button 32*e* of the controller 5 being pressed down.

The angle of depression of the virtual camera is changed, depending on the designation of the angle-of-depression increasing button 67 or the angle-of-depression decreasing button 66 of FIG. 11 by the cursor. Specifically, the CPU 10, when the angle-of-depression increasing button 67 is designated by the cursor, changes the orientation of the virtual camera so that the angle of depression of the virtual camera is increased, and when the angle-of-depression decreasing button 66 is designated by the cursor, changes the orientation of the virtual camera so that the angle of depression of the virtual camera is decreased. Note that the angle of depression may be changed by moving the virtual camera. Thus, the map is displayed with the angle of depression being increased or decreased, depending on the designation of the angle-of-depression increasing button 67 or the angle-of-depression decreasing button 66.

In step S22 following step S21, a group setting process is executed. The group setting process is a process of dividing news locations displayed on the map into groups. In this exemplary embodiment, in the group setting process, the CPU 10 newly sets one group for a piece of news information which has not been put into a group, of pieces of news information displayed on the screen, and further puts, into the group, news information related to a news location having a smaller distance from a news location to which that piece of news information is related than a predetermined distance (r2) in the display region. This process is repeatedly executed until no news information remains which has not been put into a group. Hereinafter, the group setting process will be described in detail with reference to FIG. 22.

Figure 21:
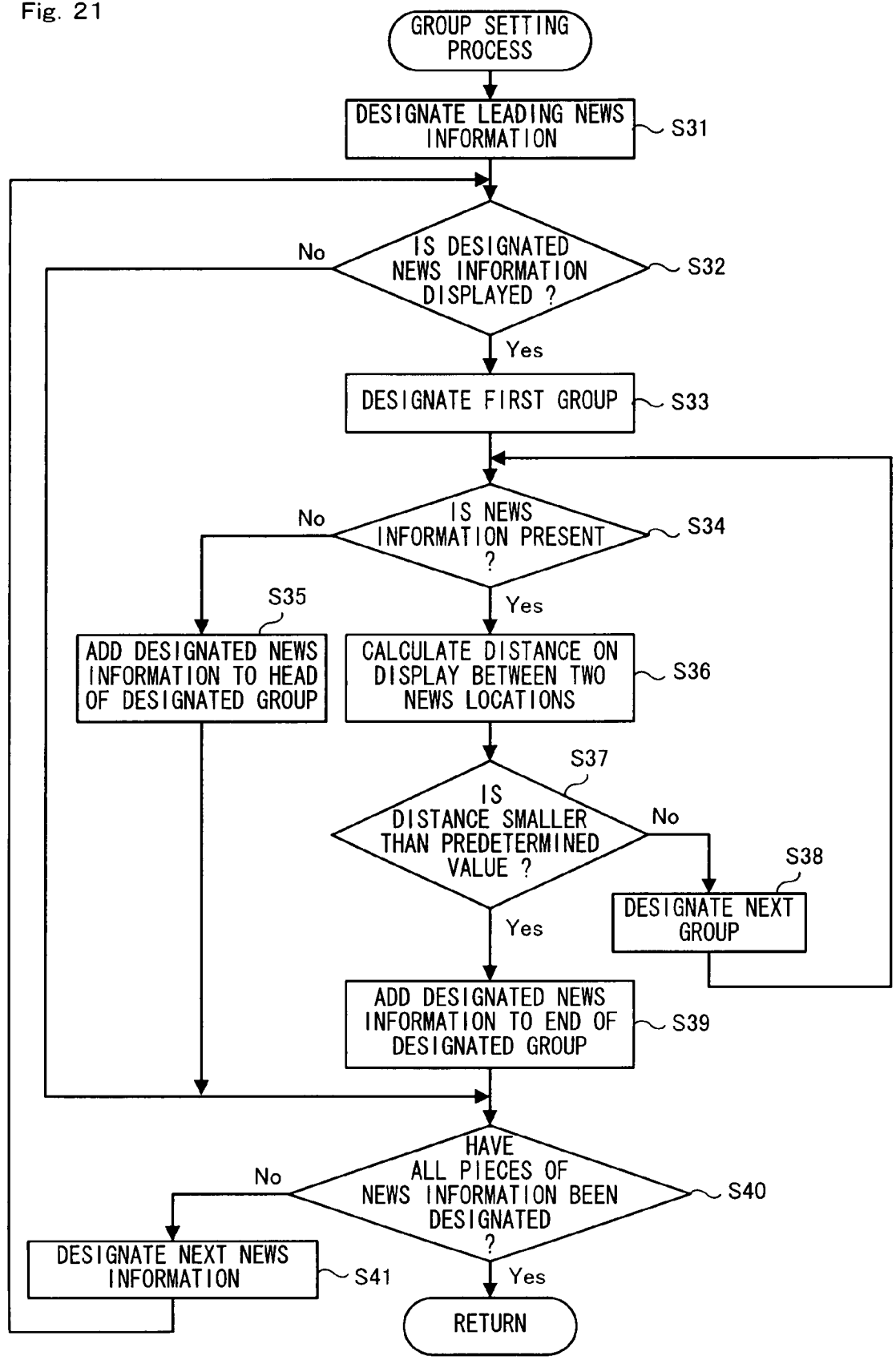
FIG. 21 is a flowchart illustrating a flow of a group setting process (step S22) of FIG. 20.

FIG. 21 is a flowchart illustrating a flow of the group setting process (step S22) of FIG. 20. In the group setting process, initially, in step S31, the CPU 10 designates leading news information stored in the first news buffer 84. Specifically, the value of a first counter i is set to be i=1. The first counter i represents i-th news information stored in the first news buffer 84. Note that, in the following description of the group setting process, news information designated in step S31 or step S41 described below is referred to as "designated news information". Following step S31, a process of step S32 is executed.

In step S32, the CPU 10 determines whether or not there is a possibility that the designated news information is displayed on the screen. The determination in step S32 is executed using, for example, a line-of-sight vector of the virtual camera, and a vector from a center of the spherical map from a location to which the designated news information is related. Specifically, when the inner product of the two vectors is negative, the location is positioned on a front surface of the sphere as viewed from the virtual camera in a line-of-sight direction of the virtual camera. In this case, therefore, it can be determined that there is the possibility that the designated news information is displayed on the screen. On the other hand, when the inner product of the two vectors is positive, the location is positioned on a rear surface of the sphere as viewed from the virtual camera in the line-of-sight direction of the virtual camera. In this case, therefore, it can be determined that there is no possibility that the designated news information is displayed on the screen. Note that the process of step S32 is executed for the purpose of eliminating designated news information which has no possibility of being displayed on the screen from subjects of a grouping process executed in step S33 and thereafter, as much as possible, but not for the purpose of extracting designated news information to be displayed on the screen. In other words, in the determination process of step S32, the determination result may be positive with respect to designated news information which is not actually displayed on the screen. When the determination result of step S32 is positive (there is the possibility that the designated news information is displayed on the screen), the process of step S33 is executed. On the other hand, when the determination result of step S32 is negative (there is no possibility that the designated news information is displayed on the screen), a process of step S40 described below is executed.

In step S33, the CPU 10 designates a first group stored in the second news buffer 85. Specifically, the value of a second counter j is set to be j=1. The second counter j represents a j-th group stored in the second news buffer 85. Note that, in the following description of the group setting process, a group designated in step S33 or step S38 described below is referred to as a "designated group". Following step S33, a process of step S34 is executed.

In step S34, the CPU 10 determines whether or not news information is included in the designated group (i.e., whether or not the designated group is present). The determination in step S34 is executed using the number of groups (groups including news information) stored in the second news buffer 85, and the value of the second counter j. Specifically, when the value of the second counter j is smaller than the number of groups including news information, it is determined that news information is included in the designated group. When the value of the second counter j is larger than or equal to the above-described number, it is determined that news information is not included in the designated group. When the determination result of step S34 is negative, a process of step S35 is executed. On the other hand, when the determination result of step S34 is positive, a process of step S36 described below is executed.

In step S35, the CPU 10 adds designated news information to the head of the designated group. Specifically, the designated news information is added as new news information to the second news buffer 85, and a group including the designated news information at the head thereof is added to the second news buffer 85. More specifically, a new element representing the designated news information is added and stored in the second news buffer 85. In this element, a news information designating pointer for designating news information data designates news information data of the designated news information. Also, a next element designating pointer for designating an element which is to be next connected, indicates that there is no element to be next connected. By the above-described process of step S35, a j-th group is newly set. Following step S35, the process of step S40 described below is executed.

On the other hand, in step S36, the CPU 10 calculates a distance on the display between a position where a news location to which the designated news information is related is displayed, and a position where a news location to which leading news information in the designated group is related is displayed. Specifically, positions in the display region where the two news locations are displayed are calculated. A position where a news location is displayed is obtained by projecting the news location on a map in a three-dimensional space onto a predetermined projection plane based on the map provided in step S5 and the position and orientation of the virtual camera set in step S21. Next, a distance between the thus-calculated display positions of the two news locations is calculated. The CPU 10 calculates the distance by the calculated described above.

In the following step S37, the CPU 10 determines whether or not the distance calculated in step S36 is smaller than the predetermined distance r2. Here, in this exemplary embodiment, the predetermined distance r2 is set based on a reference (specifically, the radius r1) which is used to set a reference region for a news location, and specifically, has a value two times larger than the radius r1 of the reference region. The determination process of step S37 is a process of determining whether or not a distance between the display position of the news location to which the designated news information is related, and the display position of the news location to which the leading designated news information of the designated group is related, is smaller than the predetermined distance. In other words, in step S37, it is determined whether or not the news location to which the designated news information is related is included in the designated group. When the determination result of step S37 is negative, a process of step S38 is executed. On the other hand, when the determination result of step S37 is positive, a process of step S39 described below is executed.

As described above, in this exemplary embodiment, in the processes of steps S36 and S37, the display positions of the news location to which the news information which has been added to the head of the designated group in step S35 is related, and the news location to which the designated news information is related, are compared with each other. In other words, in this exemplary embodiment, the news location to which the leading news information of the group is related is used as the reference location.

In step S38, the CPU 10 newly designates a group next to the current designated group. Specifically, the value of the second counter j is incremented (added by one). After step S38, the process of step S34 is executed again.

On the other hand, in step S39, the CPU 10 adds the designated news information to the end of the list of the designated group. Specifically, a new element representing the designated news information is added and stored into the second news buffer 85. In this element, the news information designating pointer designates the news information data of the designated news information. Also, the next element designating pointer indicates that there is no element which is to be next connected. Further, in an element connected before the newly added element, the next element designating pointer is changed to designate the newly added element. By the above-described process of step S39, the designated news information is added to the end of the list of the designated group. Following step S39, the process of step S40 is executed.

In step S40, the CPU 10 determines whether or not all pieces of news information stored in the first news buffer 84 have been designated. The determination process of step S40 is a process of determining whether or not all pieces of news information have been divided into groups. When the determination result of step S40 is negative, a process of step S41 is executed. On the other hand, when the determination result of step S40 is positive, the CPU 10 ends the group setting process.

In step S41, the CPU 10 newly designates news information next to the current designated news information. Specifically, the value of the first counter i is incremented. After step S41, the process of step S32 is executed again.

By the above-described group setting process, each piece of news information stored in the first news buffer 84 is put into a group. Specifically, the pieces of news information are designated sequentially one by one from the head, and it is determined whether or not the news information is included in a group which is already set (a group including other news information) (steps S36 and S37). When the determination result is positive (Yes in step S37), the news information is added to the end of the list of the group. When the determination result is negative (No in step S37), the next group is designated (step S38), and determination similar to that described above is executed (steps S36 and S37). When news information cannot be included in any groups which are already set (No in step S34), a group which includes the news information at the head thereof is newly set (step S35). By executing the above-described process for pieces of news information stored in the first news buffer 84, a group is set for each piece of news information.

Also, in steps S36 and S37, a distance on the display between a news location to which designated news information is related, and a news location to which leading news information of a designated group is related, is small (within the predetermined distance r2) (Yes in step S37), the designated news information and the leading news information are put into the same group (step S39). In other words, the news location to which the designated news information is related, and the news location to which the leading news information of the designated group is related, are put into the same group. Thus, by the group setting process, a group is set for each piece of news location on the map.

In the group setting process described above, only a news location to which leading news information of a group is related is subjected to comparison with a news location to which designated news information is related (step S37). In other words, the news location to which leading news information of the group is related is a reference location. Therefore, the display position of the reference location is present within the predetermined distance r1 in the display region from all other news locations included in the group. Therefore, two news locations whose display positions are located at a distance two or more times larger than the predetermined distance r1 from each other, are not put into one group. In other words, the range of news locations which are put into one group is not larger than necessary, i.e., groups can be appropriately set.

Note that, in the group setting process of this exemplary embodiment, news information stored at an earlier place in the first news buffer 84 is designated earlier, and therefore, is set as a reference location with higher priority. Therefore, the sequence in which pieces of news information are stored in the first news buffer 84 is determined in accordance with a predetermined criterion, thereby making it possible to determine the type of news information which is set as a reference location with higher priority. For example, if pieces of news information are stored in the first news buffer 84 in order of the date of news (latest first), later news information can be set as a reference location with higher priority. Alternatively, priority is previously set for news information (specifically, data indicating the priority is included in the news information data 93 included in the distribution data 83), and pieces of news information may be stored in the first news buffer 84 in order of the priority.

Referring back to FIG. 20, an image generating process is executed in step S23 following step S22. The image generating process is a process of generating an image (e.g., the image of FIG. 11) to be displayed on the television 2 in the map display mode. Hereinafter, the image generating process will be described in detail with reference to FIG. 23.

Figure 22:
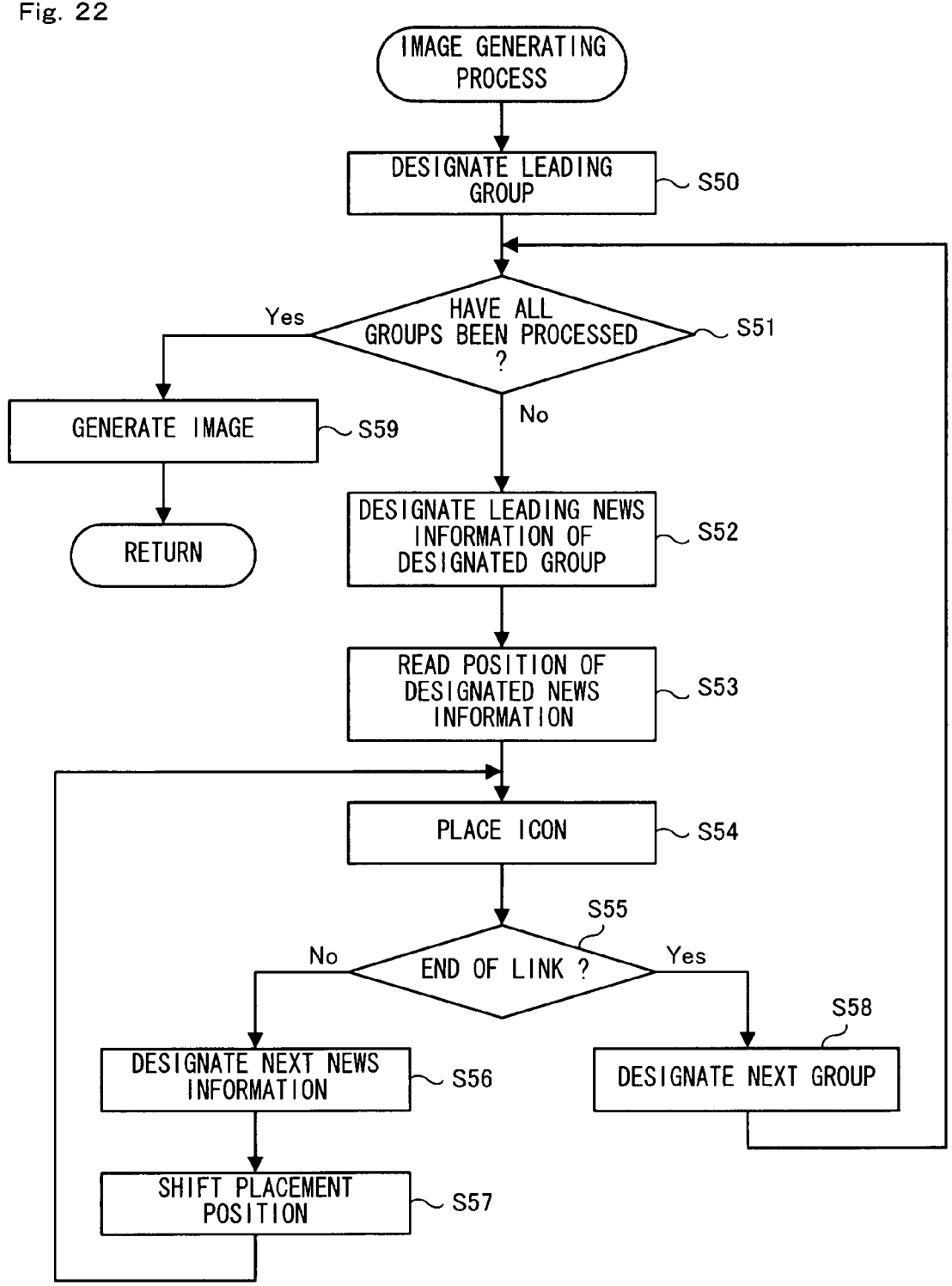
FIG. 22 is a flowchart illustrating a flow of an image generating process (step S23) of FIG. 20.

FIG. 22 is a flowchart illustrating a flow of the image generating process (step S23) of FIG. 20. In the image generating process, initially, in step S50, the CPU 10 designates the leading group (first group) of the groups stored in the second news buffer 85. Specifically, the value of the second counter j is set to be j=1. Note that, in the following description of the image generating process, a group designated in step S50 or step S58 described below is referred to as a "designated group". Following step S50, a process of step S51 is executed.

In step S51, the CPU 10 determines whether or not all of the groups stored in the second news buffer 85 have been subjected to processes of step S52 and thereafter. The determination in step S51 is executed using the number of the groups stored in the second news buffer 85 and the value of the second counter j. Specifically, when the value of the second counter j is larger than the number of groups including news information, it is determined that all of the groups have been subjected to the processes of step S52 and thereafter. When the value of the second counter j is smaller than or equal to the above-described number, it is determined that a group is present which has not been subjected to the processes of step S52 and thereafter. When the determination result of step S51 is negative, the process of step S52 is executed. On the other hand, when the determination result of step S51 is positive, a process of step S59 described below is executed.

In step S52, the CPU 10 designates the leading news information of the designated group. Specifically, the value of a third counter k is set to be k=1. The third counter k indicates k-th news information as counted from the head of the designated group. Note that, in the following description of the image generating process, news information designated in step S52 or step S56 described below is referred to as "designated news information".

In the following step S53, the CPU 10 reads out the position in the three-dimensional space of the designated news information (i.e., the position of a news location related to the designated news information). The CPU 10 reads out the position data 96 included in the news information data 93 corresponding to the designated news information from the main memory 13. Note that the news information data 93 corresponding to the designated news information is designated by a news information designating pointer included in an element of the designated news information stored in the second news buffer 85. In step S53, the position of a news location related to the leading news information of a group is read out. Therefore, the position read out in step S53 is the position of a reference location. Following step S53, a process of step S54 is executed.

In step S54, the CPU 10 generates an icon object representing the designated news information, and places the object in the three-dimensional virtual space. The icon object is generated using the contents (an entry, a text, an image, etc.) of the designated news information. In this exemplary embodiment, when image data is included in news information data corresponding to the designated news information, the icon object is generated using the image data. Alternatively, when the news information data corresponding to the designated news information does not include image data, the icon object is generated using entry data and text data included in the news information data.

Also, a position where the icon object is placed is determined based on the position data 96 read out in step S53. Specifically, the icon object is placed at a position a predetermined height above (in a direction perpendicular to the surface of the spherical map) a position (the position of the reference location) indicated by the position data 96.

In step S55, the CPU 10 determines whether or not the icons of all pieces of news information included in the designated group have been placed in the virtual space. The determination process of step S55 is executed based on whether or not the designated news information is at the end of link. Note that it can be known whether or not the designated news information is at the end of link, by referencing a next element designating pointer included in an element of the designated news information stored in the second news buffer 85. When the determination result of step S55 is negative, the process of step S56 is executed. On the other hand, when the determination result of step S55 is positive, the process of step S58 described below is executed.

In step S56, the CPU 10 newly designates the next designated news information connected to the current designated news information in the designated group. Specifically, the value of the third counter k is incremented.

In the following step S57, the CPU 10 shifts the placement position of an icon object which is of news information included in the designated group and which is already placed in step S54. Specifically, the icon object is shifted and placed at a position the predetermined height above. Following step S57, the process of step S54 is executed again. In step S54 next executed, an icon of the designated news information newly designated in step S56 is placed at a position the predetermined height above the position of the reference location. Therefore, by repeatedly executing the processes of steps S54 to S57, the icons of pieces of news information included in one group are displayed with the icons being stacked upward (see FIG. 12). Also, since the position of the reference location is specified in step S53, the icons of pieces of news information included in one group are stacked over the position of the reference location in the processes of the following steps S54 to S57.

In this exemplary embodiment, by steps S54 to S57, the icons of pieces of news information included in one group are placed in descending order of the place where news information is stored in the first news buffer 84. Therefore, by determining the order in which pieces of news information are stored in the first news buffer 84 in accordance with a predetermined criterion, the order in which the icons of pieces of news information included in one group are placed can be determined in accordance with the predetermined criterion. For example, by assigning a priority to news information, and in accordance with the priority, determining the order in which news information is stored in the first news buffer 84, the icon of news information having a higher priority can be placed at a higher position. Alternatively, in other exemplary embodiments, a process of changing the arrangement of icons may be executed before the process of step S59. For example, the arrangement of icons may be changed so that news information for which image data is included in the news information data is placed at a highest position.

On the other hand, in step S58, the CPU 10 newly designates the next group of the current designated group. Specifically, the value of the second counter j is incremented. After step S58, the process of step S51 is executed again. Thereafter, the process loop of step S51 to S58 is repeatedly executed until the determination result of step S51 is positive, i.e., the icons of pieces of news information included in all groups stored in the second news buffer 85 are placed in the virtual space.

On the other hand, in step S59, the CPU 10 generates an image to be displayed on the screen. Specifically, initially, an image of the map and the object as viewed from the virtual camera is generated by a perspective transformation process. Further, by superposing images of the cursor and the various buttons 64 to 67 to the generated image, an image to be displayed on the screen is generated (FIGS. 11 and 12). In the map display mode, the image generated in step S59 is displayed on the screen of the television 2 (step S13 described below). After step S59, the CPU 10 ends the image generating process.

As described above, in this exemplary embodiment, since, in the map display mode, the group setting process (step S22) is executed every time an image of a map to be displayed on the screen is generated, grouping is executed in real time. Here, when the scale of the map or the angle of depression of the virtual camera is changed in step S21, a plurality of news locations are displayed close together, so that it may be difficult to separately designate each piece of news location on the screen. In contrast to this, in this exemplary embodiment, grouping is executed in real time, and therefore, is appropriately executed, depending on the display situation of the map.

In this exemplary embodiment, a determination region set for each group is not displayed on the screen. In other exemplary embodiments, the determination region may be displayed on the screen. Thereby, it is easier to perform an operation of designating a position in the determination region using a cursor. Further, in this case, an icon having the same size and shape as those of the determination region may be displayed at the position of the determination region.

Referring back to FIG. 20, in S24 following step S23, the CPU 10 sets the determination region with respect to each group set in the second news buffer 85. In this exemplary embodiment, the determination region set with respect to each group is the reference region set at the reference location included in the group (see FIG. 10). Specifically, the determination region is set based on the display position of the reference location included in the group. More specifically, the determination region is set as a circular region having a radius r1 where the center is the display position of the reference location. Therefore, in this exemplary embodiment, all the determination regions set for the groups have the same size and shape. Therefore, it is easy to perform an operation of designating a group using a cursor as compared to the case when each group has a different size or shape.

In step S24, data indicating the determination region thus set is stored as the determination region data 87 into the main memory 13. Here, since the determination region is a circular region having the predetermined radius r1, the determination region can be specified using data indicating the display position of the reference location. Therefore, in this exemplary embodiment, the CPU 10 stores the data indicating the display position of the reference location as the determination region data 87 into the main memory 13. Note that data indicating a determination region set for each group is stored as the determination region data 87 into the main memory 13.

As described above, in this exemplary embodiment, the reference region set at the reference location is used as the determination region. Here, in other exemplary embodiments, the determination region may be set as a region including news locations included in a group. Specifically, a region composed of the reference regions of news locations included in a group may be set as a determination region. Thereby, all the positions of the news locations included in a group are present within the determination region, so that if the position of a piece of news location is designated by a cursor, a group including the news location can be reliably selected. Also, in other exemplary embodiments, a circular region having a radius r1 where the center is a position calculated based on the display positions of news locations included in a group (e.g., the center-of-gravity position of the display positions of the news locations) may be set as a determination region. Thereby, the determination region can be set so that the position is changed, depending on the number of news locations included in a group and the display positions of the news locations.

In step S25 following step S24, the CPU 10 determines whether or not a group has been selected using a cursor operated by the user. Specifically, initially, with reference to the operation data acquired in step S3, it is determined whether or not a predetermined button (e.g., the A button 32d) is currently pressed down. When the predetermined button is not pressed down, the determination result of step S25 is negative. On the other hand, when the predetermined button is pressed down, the CPU 10 determines whether or not the cursor position is present within any of the determination regions set in step S24. Note that data indicating the cursor position is stored as the cursor data 86 in the main memory 13. When the cursor is positioned within any of the determination regions, the determination result of step S25 is positive. Note that, in this case, the CPU 10 stores, into the main memory 13, data indicating a group for which a determination region within which the cursor is positioned is set. On the other hand, when the cursor is not positioned within any of the determination regions, the determination result of step S25 is negative. When the determination result of step S25 is positive, a process of step S26 is executed. On the other hand, when the determination result of step S25 is negative, the process of step S26 is skipped, and the map display mode process is ended.

In step S26, the CPU 10 changes the process mode from the map display mode to the list display mode. Thereby, in the next frame process (the processes of steps S3 to S14), the determination result of step S7 is positive, and a list display mode process is executed. After step S26, the CPU 10 ends the map display mode process. Note that, following the map display mode process, the process of step S13 of FIG. 19 is executed.

Referring back to FIG. 19, in step S9, the list display mode process is executed. The list display mode process is a process of displaying a list of pieces of news information which are related to news locations included in a group selected in the map display mode. Hereinafter, the list display mode process will be described in detail with reference to FIG. 23.

Figure 23:
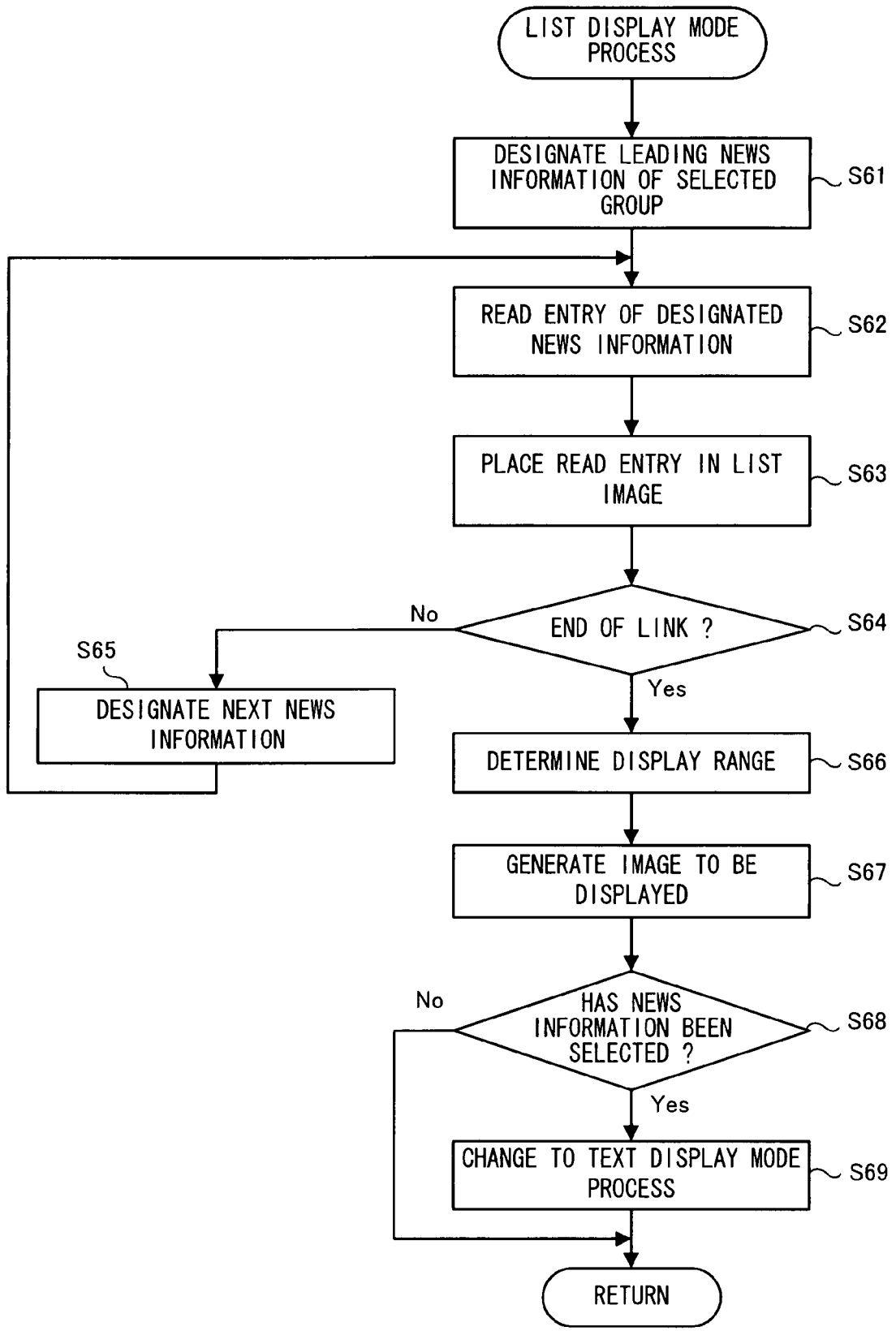
FIG. 23 is a flowchart illustrating a flow of a list display mode process (step S9) of FIG. 19.

FIG. 23 is a flowchart illustrating a flow of the list display mode process (step S9) of FIG. 19. In the list display mode process, initially, in step S61, the CPU 10 designates leading news information included in a group selected in the immediately previous map display mode. Specifically, the value of the third counter k is set to be k=1. In the list display mode process, the third counter k indicates k-th news information as counted from the head of the group selected in the immediately previous map display mode. Note that, in the following description of the list display mode process, news information designated in step S61 or step S65 described below is referred to as "designated news information".

In the following step S62, the CPU 10 reads out entry data of the designated news information from the main memory 13. Specifically, the CPU 10 reads out the entry data 97 included in the news information data 93 corresponding to the designated news information from the main memory 13. In the following step S63, the CPU 10 uses the entry data 97 read out in step S62 to generate an image of the entry of the designated news information, and places the generated image in a list image (the list image 71 of FIG. 14). Note that entry images are arranged sequentially downward from the top of the list image.

In the following step S64, the CPU 10 determines whether or not the entry images of all pieces of news information included in the group selected in the immediately previous map display mode have been placed in the list image. The determination process of step S64 is executed in a manner similar to that of step S55, i.e., based on whether or not the designated news information is at the end of the link. When the determination result of step S64 is negative, a process of step S65 is executed. On the other hand, when the determination result of step S64 is positive, a process of step S66 described below is executed.

In step S65, the CPU 10 newly designates the next designated news information connected to the current designated news information in the designated group. Specifically, the value of the third counter k is incremented. Following step S65, the process of step S62 is executed again. Thereafter, the processes of steps S62 to S65 are repeatedly executed until it is determined in step S64 that the entry images of all pieces of news information have been placed in the list image. Thereby, the news information entry images are arranged sequentially downward from the top of the list image. Thereafter, when the determination result of step S64 is positive, the list image is completely generated.

As described above, the news information entry images are arranged downward, so that the vertical length of the list image may be longer than the vertical length of what can be displayed on the screen. Therefore, in step S66, the CPU 10 determines a range of the generated list image which is displayed on the screen. Specifically, during the start of the list display mode, a range having a predetermined length from an uppermost portion of the list image is determined as the range to be displayed on the screen. When the scroll-up button 72 is designated using a cursor in the list display mode, the range to be displayed on the screen is moved upward by a length corresponding to one entry image. When the scroll-down button 73 is designated using the cursor in the list display mode, the range to be displayed on the screen is moved downward by the length corresponding to one entry image.

In the following step S67, the CPU 10 generates an image to be displayed in the list display mode. Specifically, initially, an image of the display range determined in step S66 is extracted from the list image generated in steps S62 to S65. Further, the image of the cursor and the images of the scroll-up button 72 and the scroll-down button 73 are superposed on the extracted image to generate the image to be displayed on the screen (FIG. 14). In the list display mode, the image generated in step S67 is displayed on the screen of the television 2 (step S13 described below).

In step S68 following step S67, the CPU 10 determines whether or not news information has been selected using the cursor operated by the user. Specifically, initially, with reference to the operation data acquired in step S3, it is determined whether or not a predetermined button (e.g., the A button 32d) is currently pressed down. When the predetermined button is not pressed down, the determination result of step S68 is negative. On the other hand, when the predetermined button is pressed down, the CPU 10 determines whether or not the cursor is positioned within any of the entry images included in the displayed list image. Note that data indicating the cursor position is stored as the cursor data 86 in the main memory 13. When the cursor is positioned within any of the entry images, the determination result of step S68 is positive. Note that, in this case, the CPU 10 stores, into the main memory 13, data indicating news information corresponding to an entry image in which the cursor is positioned. On the other hand, when the cursor is not positioned within any of the entry images, the determination result of step S68 is negative. When the determination result of step S68 is positive, a process of step S69 is executed. On the other hand, when the determination result of step S68 is negative, the process of step S69 is skipped, and the list display mode process is ended.

In step S69, the CPU 10 changes the process mode from the list display mode to the text display mode. Thereby, in the next frame process (the processes of steps S3 to S14), the determination result of step S6 is positive, so that the text display mode process (the processes of steps S10 to S12) is executed. After step S69, the CPU 10 ends the list display mode process. Note that, following the list display mode process, the process of step S13 of FIG. 19 is executed.

Referring back to FIG. 19, in steps S10 to S12, the text display mode process is executed. Specifically, in step S10, the CPU 10 generates an image to be displayed in the text display mode. In the process of step S10, initially, the entry data and the text data of the news information selected in the immediately previous list display mode are read out. Specifically, the CPU 10 reads out the entry data 97 and the text data 98 included in the news information data 93 corresponding to the news information from the main memory 13. Note that, when image data is included in the news information data 93, the image data is read out in addition to the entry data 97 and the text data 98. The CPU 10 uses the read data to generate a news content image. Next, the CPU 10 generates a map image by a process similar to that in the map display mode. Further, the CPU 10 superposes the news content image, the map image, and the image of a return button together to generate the image to be displayed in the text display mode (FIG. 15). In the text display mode, the image generated in step S10 is displayed on the screen of the television 2 (step S13 described below).

In step S11 following step S10, the CPU 10 determines whether or not a return operation for returning from the text display mode to the map display mode has been performed. The determination in step S11 is executed based on whether or not the return button on the screen has been selected using the cursor. When the determination result of step S11 is positive, the process of step S12 is executed. On the other hand, when the determination result of step S11 is negative, the process of step S12 is skipped and the process of step S13 is executed.

In step S12, the CPU 10 changes the process mode from the text display mode to the map display mode. Thereby, in the next frame process (the processes of steps S3 to S14), the determination result of step S7 is negative, and the map display mode process is executed. Following step S12, the process of step S13 is executed.

In step S13, the CPU 10 displays the image generated in step S10, S23 or S67 on the television 2. Thereby, images as illustrated in FIGS. 11 to 15 are displayed. In the following step S14, the CPU 10 determines whether or not to end the process. The determination in step S14 may be executed based on, for example, whether or not a predetermined operation of ending the process has been performed by the user. When the determination result of step S14 is negative, the process of step S3 is executed again. Thereafter, the process loop of steps S3 to S14 is repeatedly executed until it is determined in step S14 that the process is ended. On the other hand, when the determination result of step S14 is positive, the CPU 10 ends the process of FIG. 19.

As described above, according to this exemplary embodiment, when news locations to which news information is related are displayed on the screen, groups are set so that news locations having a short distance on the display between each news location are put into one group (step S22). Thereafter, a determination region is set for each group (step S24). When the user designates a position on the screen using a cursor, the determination region is used to determine whether or not a group has been selected (step S25), and a list of news information is displayed for the selected group as a unit (step S9). Thus, in this exemplary embodiment, when a plurality of news locations are displayed close together, the news locations are selected together. Thereby, a plurality of news locations are displayed close together, and therefore, even when it is difficult to designate each news location on the screen, it is possible to prevent the user from erroneously selecting an unintended news location, so that the operation of selecting news information can be easily performed.

Although it has been described in the exemplary embodiment above that the reference region and the determination region are circular regions by way of example, the shape of the regions is not limited to this. A region having any shape previously set on a map may be used as a reference region or a determination region. For example, for Japan, the entire region of Japan is divided into prefectures, which may be used as reference regions of news locations. Specifically, a reference region corresponding to a news location may be set as a prefectural region including the news location. In this case, the game device 3 may store information about the divided regions (prefectures) as a predetermined criterion for setting reference regions for positions in the display region of news locations. Based on the information, reference regions may be set for news locations. When the prefectural region is used as a reference region, the determination region may be set as a region within a predetermined distance from a reference location, a region in a prefecture including the reference location, or a region including all regions in a prefecture corresponding to news locations included in a group.

Note that, when the prefectural region is used as a reference region as described above, it may be determined in steps S36 and S37 whether or not the reference regions of news locations to be compared, to which two pieces of news information are related, are adjacent to each other. Specifically, when the determination result is positive, the two pieces of news information may be put into one group (the process of step S39 is performed). When the determination result is negative, the two pieces of news information may be put into separate groups (the process of step S38 is executed). Thus, in the determination process of step S37, pieces of news information whose news locations have a distance therebetween smaller than a predetermined reference may be put into a group, and the predetermined reference is not limited to a reference relating to the distance.

Further, in other exemplary embodiments, the determination of whether or not two pieces of news information are put into one group may be executed based on a position where the place name of a news location is displayed. For example, when a position where a place name is displayed is previously determined, the place names of two news locations may overlap due to a change in scale or the like. In such a case, grouping may be set so that pieces of news information are put into one group. Specifically, the game device 3 executes the following process. Initially, it is assumed that each news location is assigned a position (location) where the place name of the news location is displayed (therefore, a location related to news information can be regarded as a location where the place name is displayed). In step S37, the CPU 10 compares a position (location) where the place name of a news location is displayed, between a news location related to news information which is added to the head of a designated group in step S35, and a news location related to designated news information. As a result of the comparison, when a distance between the display positions of the two place names is smaller than or equal to a predetermined distance, it is determined that the two pieces of news information are put into one group. Conversely, when the distance between the display positions of the two place names is larger than the predetermined distance, it is determined that the two pieces of news information are not put into one group. Thus, a location to which news information is related may be a location to which the news information is directly related, or alternatively, a location (indirectly related to a news location) which is related to a location which is directly related to a news location.

Although it has been described in the exemplary embodiment above that the game device 3 constructs and displays a map as a three-dimensional virtual space by way of example, certain exemplary embodiments can be applied to the case where a map is constructed as a two-dimensional plane. Specifically, the game device 3 determines a position and a size of a region to be displayed on the two-dimensional plane of the map, and displays an image of the map within the region on the television 2. Note that it is assumed that the position and size of the region can be changed by an operation by the user. Thus, the display position of a news location on the map is determined, so that news locations can be divided into groups in a manner similar to that of the group setting process of the exemplary embodiment above. In other words, in the group setting process, grouping is executed using the display position of a news location determined based on the thus-determined region.

Also, in other exemplary embodiments, the virtual space displayed on the screen of a display device is not limited to an actual map, and may be a map of a virtual world, or a predetermined space (plane) other than maps. As an example of the former, for example, it is contemplated that an object (e.g., an item) placed at a location on a game map is displayed together with the game map. As an example of the latter, for example, it is contemplated that an icon representing a file or a program is placed on a predetermined virtual plane as on the desktop screen of an OS used in a personal computer.

Although it has been described in the exemplary embodiment above that news information is related to a predetermined position in a virtual space, any information may be related to a predetermined position as long as its contents are displayed by the user selecting it. For example, when the virtual space is a game map, information which is related to a predetermined position on the game map may be information about an item or an opponent present at the predetermined position.

As described above, certain exemplary embodiments can be utilized as a display control device and a display control program for providing, for example, news information to the user for the purpose of facilitating selection of information related to a location when the user selects a location in a virtual space, such as a map or the like.

While certain exemplary embodiments have been described in detail, the foregoing description is in all aspects illustrative and not restrictive. It is understood that numerous other modifications and variations can be devised without departing from the scope of these certain exemplary embodiments.

What is claimed is:

1. A non-transitory computer readable storage medium storing a display control program which is executable by a computer of a display control device for providing a display on a display device of a particular region of a three-dimensional virtual space captured by a virtual camera placed in the three-dimensional space and displaying particular pieces of information corresponding to user selected positions within a displayed region of the virtual space, wherein the display control device has access to storage memory which contain a plurality of particular pieces of the information which relate to particular locations in the virtual space, and wherein the display control program causes the computer to perform operations and function as:
   a virtual camera setting changer which changes at least an attitude of the virtual camera provided in the three-dimensional virtual space in accordance with an input provided via an input device by a user;
   a display position calculator which calculates distances between display positions in a displayed region of the virtual space of the locations in the virtual space to which the plurality of pieces of the particular information are related based on a setting of the virtual camera;
   a display position comparator which compares the calculated distances between the displays positions;
   an information group setter which sets a group of pieces of the plurality of pieces of particular information related to the locations for which a distance between the display positions is smaller than a predetermined first reference based on a result of the display position distance comparison, thereby dividing the plurality of particular pieces of information into a plurality of groups of particular information;
   a determination region setter which sets a determination region corresponding to each group within the displayed region based on display positions of the locations to which grouped information is related;
   a first display controller which generates and displays an image of the virtual space on the display device based on the setting of the virtual camera;
   a first input receiver which receives an input via the input device from the user for designating a position within the displayed region; and
   a second display controller which, when a designated position provided via the input device by the user is located within the set determination region, displays the particular pieces of information which are included in a group corresponding to the determination region on the display device.

2. The non-transitory storage medium according to claim 1, wherein the computer repeatedly executes a process of newly setting one group for predetermined display information for which a group has not been set, and putting, into the group, display information related to a location having a smaller distance from a location related to the display information in the display region than a predetermined distance, until no display information for which a group has not been set remains.

3. The non-transitory storage medium according to claim 2, wherein the storage memory further stores a predetermined second reference for setting a region with respect to a position in the display region of each location, the computer sets the predetermined distance based on the second reference, and the computer sets a region for a location to which a predetermined piece of display information included in a group is related, based on the second reference, as a determination region corresponding to the group.

4. The non-transitory storage medium according to claim 3, wherein the determination region is a circular region having a radius of a first length, the storage memory stores the first length as the second reference, and the computer sets the predetermined distance to be a length two times larger than the first length.

5. The non-transitory storage medium according to claim 4, wherein the determination region is a circular region having a position in the display region of the location as a center thereof.

6. The non-transitory storage medium according to claim 1, wherein the computer sets a region including all locations to which display information included in a group is related, as a determination region for the group.

7. The non-transitory storage medium according to claim 1, wherein the storage memory further stores a predetermined second reference for setting a region for a display position in the display region of each location, and
   the computer sets a region for each location to which display information included in a group is related, based on the second reference, and sets each set region as a determination region corresponding to the group.

8. The non-transitory storage medium according to claim 1, wherein the computer calculates a display position in the display region based on a display position of each location to which display information included in a group is related, and sets a region including the calculated position as a determination region corresponding to the group.

9. The non-transitory storage medium according to claim 1, wherein the computer displays an image of the virtual space and an image representing a group in relation to a position of the determination region corresponding to the group.

10. The non-transitory storage medium according to claim 1, wherein the computer displays a list of display information included in a group corresponding to the determination region when the designated position is present within the determination region.

11. The non-transitory storage medium according to claim 10, wherein the display control program causes the computer to further perform:

receiving an input of selecting display information from the list of display information displayed in the second display control, and, when display information is selected in the second input receipt, displaying the selected display information on the display device.

12. The non-transitory storage medium according to claim 1, wherein the display control program further causes the computer to:

set a group of display information pieces based on one or more calculated display position, and generate an image of the three-dimensional space based on the setting change of the virtual camera and display the image on the display device.

13. The non-transitory storage medium according to claim 1, wherein the display control program alternatively provides a display of a two-dimensional virtual space along with particular pieces of information corresponding to user selected positions within a displayed region of the two-dimensional virtual space, and wherein the display control program also causes the computer to changeably set a size of a region within the two-dimensional space to be displayed, and to display an image of the region on the display device.

14. A display control device for providing a display of a particular region of a three-dimensional virtual space captured by a virtual camera placed in the three-dimensional space and displaying particular pieces of information corresponding to user selected positions within a displayed region of the virtual space, comprising:

a computer system, including a computer processor, an information storage memory, an input device for providing inputs from a user of the computer system and a display device, the computer system being at least configured to:

store in the storage memory a plurality of particular pieces of information which relate to particular locations in the virtual space;

change at least an attitude setting of the virtual camera provided in the three-dimensional virtual space, in accordance with an input provided via the input device by a user;

calculate distances between display positions in a displayed region of the virtual space of the locations in virtual space to which the plurality of pieces of the particular information are related based on a setting of the virtual camera;

compare the calculated distances between said display positions;

set a group of pieces of particular information related to the locations for which a distance between the display positions is smaller than a predetermined first reference based on a result of the comparison of the calculated distances, thereby dividing the plurality of pieces of particular information into a plurality of groups of particular information;

set a determination region corresponding to each group of particular information within the displayed region based on display positions of the locations to which grouped information is related;

generate and display an image of the virtual space on the display device based on the setting of the virtual camera;

receive an input via the input device from the user for designating a position within the displayed region; and when a designated position provided via the input device by the user is located within the determination region, display the particular pieces of information which are included in a group corresponding to the set determination region on the display device.

15. A data distributing system comprising a display control device for providing a display of a particular region of a three-dimensional virtual space captured by a virtual camera placed in the three-dimensional space and displaying particular pieces of information corresponding to user selected positions within a displayed region of the virtual space, and a server capable of communicating with the display control device, wherein the server transmits distribution data indicating relations between locations in the virtual space and one or more of the particular pieces of information, to the display control device, and wherein the display control device comprises a computer system, including a computer processor, an information storage memory, a display device and an input device for providing inputs from a user of the computer system, the computer system being at least configured to:

change at least an attitude of the virtual camera provided in the three-dimensional virtual space in accordance with an input provided by a user via the input device;

calculate distances between display positions in a displayed region of the virtual space of the locations in the virtual space to which the particular pieces of information are related based on a setting of the virtual camera;

compare the calculated distances between the display positions;

set a group of the pieces of information which are related to locations for which a distance between the display positions is smaller than a predetermined first reference based on a result of the display position distance comparison, thereby dividing the particular pieces of information into a plurality of groups of information;

set a determination region corresponding to each group within the displayed region based on display positions of the locations to which grouped information is related;

generate and display an image of the virtual space on the display device based on the setting of the virtual camera;

receive an input via the input device from the user for designating a position within the displayed region; and when a designated position provided via the input device by the user is located within the determination region, display the information included in a group corresponding to the set determination region on the display device.

* * * * *